(12) United States Patent
Diebold et al.

(10) Patent No.: US 12,222,518 B2
(45) Date of Patent: Feb. 11, 2025

(54) MULTI-LASER SYSTEMS HAVING MODIFIED BEAM PROFILES AND METHODS OF USE THEREOF

(71) Applicant: BECTON, DICKINSON AND COMPANY, Franklin Lakes, NJ (US)

(72) Inventors: Eric D. Diebold, Menlo Park, CA (US); Jizuo Zou, San Jose, CA (US); Jorge Manzarraga, Ann Arbor, MI (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 16/381,891

(22) Filed: Apr. 11, 2019

(65) Prior Publication Data

US 2019/0324281 A1    Oct. 24, 2019

Related U.S. Application Data

(60) Provisional application No. 62/662,115, filed on Apr. 24, 2018.

(51) Int. Cl.
*G02B 27/10* (2006.01)
*G01N 15/1434* (2024.01)
(Continued)

(52) U.S. Cl.
CPC ..... *G02B 27/0927* (2013.01); *G01N 15/1434* (2013.01); *G02B 3/0006* (2013.01); *G02B 19/0004* (2013.01); *G02B 19/0052* (2013.01)

(58) Field of Classification Search
CPC .............. G02B 3/0006; G02B 19/0004; G02B 19/0052; G02B 19/0014; G02B 27/0927;
(Continued)

(56) References Cited

U.S. PATENT DOCUMENTS

| 4,689,482 A | 8/1987 | Horikawa et al. |
| 4,826,299 A * | 5/1989 | Powell .................. G02B 3/00 359/710 |

(Continued)

FOREIGN PATENT DOCUMENTS

| JP | 2005136365 A | 5/2005 |
| JP | 2005257735 | 9/2005 |

(Continued)

OTHER PUBLICATIONS

Liu, B. et al., "Polyacetylenes containing BODIPY pendants with different connectivities: synthesis, characterization and optoelectronic properties", Polymer Chemistry, Sep. 11, 2013, vol. 5, No. 2, pp. 372-381. Abstract only.

*Primary Examiner* — Mahidere S Sahle
(74) *Attorney, Agent, or Firm* — Nicholas D. Cervenka; Bret E. Field; BOZICEVIC, FIELD & FRANCIS LLP

(57) ABSTRACT

Aspects of the present disclosure include systems with multiple lasers having modified beam profiles. Systems according to certain embodiments include a first laser that produces a first beam of light, a second laser that produces a second beam of light and a beam shaping component that receives the first beam of light and the second beam of light at substantially the same position from different angles of incidence and is configured to generate from the first beam of light and the second beam of light an output beam of light having a predetermined intensity profile along a horizontal axis. Methods for irradiating a sample in a flow stream with the output beam of light are also described. Kits having one or more lasers and a beam shaping component configured to generate from a first beam of light and a second beam of light an output beam of light having a predetermined intensity profile along a horizontal axis are also provided.

22 Claims, 12 Drawing Sheets

(51) Int. Cl.
  *G02B 3/00* (2006.01)
  *G02B 19/00* (2006.01)
  *G02B 27/09* (2006.01)

(58) Field of Classification Search
  CPC ............ G02B 27/141; G01N 15/1434; G01N 15/0227; G01N 15/1459; G01N 2015/1006
  USPC .............. 219/121.61; 250/205; 359/556, 619
  See application file for complete search history.

(56) References Cited

U.S. PATENT DOCUMENTS

| | | | |
|---|---|---|---|
| 6,580,739 | B1 | 6/2003 | Coldren et al. |
| 6,965,103 | B2 | 11/2005 | Shapiro et al. |
| 7,843,653 | B2* | 11/2010 | Cayer .................. G02B 27/095 359/708 |
| 8,031,414 | B1* | 10/2011 | Liu ..................... G02B 27/0927 359/796 |
| 2002/0190221 | A1 | 12/2002 | Hutchinson et al. |
| 2003/0017860 | A1 | 9/2003 | Swager et al. |
| 2004/0175768 | A1 | 9/2004 | Kushon et al. |
| 2007/0002925 | A1 | 1/2007 | Zediker et al. |
| 2007/0127123 | A1 | 6/2007 | Brown et al. |
| 2011/0216792 | A1* | 9/2011 | Chann .................... H01S 5/405 372/31 |
| 2014/0273193 | A1 | 9/2014 | Li |
| 2015/0077869 | A1* | 3/2015 | Meng ...................... G02B 6/28 359/737 |
| 2015/0140577 | A1 | 5/2015 | Li et al. |
| 2016/0181764 | A1* | 6/2016 | Kanskar ............... H01S 5/02251 372/44.01 |
| 2016/0266131 | A1 | 9/2016 | Liang et al. |
| 2016/0334618 | A1 | 11/2016 | Hargis et al. |
| 2017/0307503 | A1 | 10/2017 | Yan et al. |
| 2019/0310180 | A1* | 10/2019 | Heanue .............. G02B 27/0966 |
| 2019/0353890 | A1* | 11/2019 | Ueda .................... G02B 6/4206 |

FOREIGN PATENT DOCUMENTS

| | | |
|---|---|---|
| JP | 2006108358 | 4/2006 |
| JP | 2007102091 | 4/2007 |
| JP | 2010164565 | 7/2010 |
| JP | 2012168333 | 9/2012 |
| JP | 2014120560 A | 6/2014 |
| JP | 2015218304 A | 12/2015 |
| JP | 2016054295 | 4/2016 |
| JP | 2016521362 | 7/2016 |
| JP | 2018056148 | 4/2018 |
| WO | WO2007011630 A2 | 1/2007 |
| WO | WO2011154405 | 12/2011 |
| WO | WO2017043122 | 3/2017 |
| WO | WO2017105927 | 6/2017 |

* cited by examiner

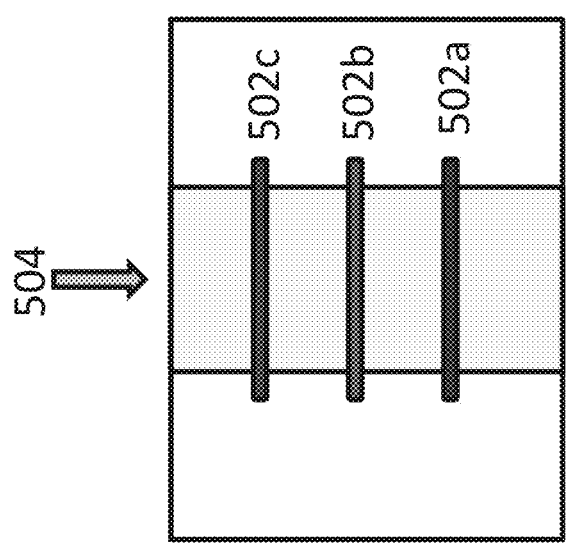

MULTI-LASER SYSTEMS HAVING MODIFIED BEAM PROFILES AND METHODS OF USE THEREOF

CROSS-REFERENCE TO RELATED APPLICATIONS

Pursuant to 35 U.S.C. § 119(e), this application claims priority to the filing date of U.S. Provisional Patent Application Ser. No. 62/662,115 filed Apr. 14, 2018; the disclosure of which application is herein incorporated by reference.

INTRODUCTION

The characterization of analytes in biological fluids has become an integral part of medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation.

To characterize the components in the flow stream, light must impinge on the flow stream and be collected. Light sources in flow cytometers can vary from broad spectrum lamps, light emitting diodes as well as single wavelength lasers. The light source is aligned with the flow stream and an optical response from the illuminated particles is collected and quantified.

SUMMARY

Aspects of the present disclosure include systems with multiple lasers having modified beam profiles. Systems according to certain embodiments include a first laser that produces a first beam of light, a second laser that produces a second beam of light and a beam shaping component that receives the first beam of light and the second beam of light at substantially the same position from different angles of incidence and is configured to generate from the first beam of light and the second beam of light an output beam of light having a predetermined intensity profile along a horizontal axis. Methods for irradiating a sample in a flow stream with the output beam of light are also described. Kits having one or more lasers and a beam shaping component configured to generate from a first beam of light and a second beam of light an output beam of light having a predetermined intensity profile along a horizontal axis are also provided.

In embodiments, an output beam of light is generated by a beam shaping component that receives a first beam of light from a first laser and a second beam of light from a second laser at substantially the same position from different angles of incidence. The beam shaping component is configured to generate from the first beam of light and the second beam of light an output beam of light having a predetermined intensity profile along a horizontal axis. The first beam of light and the second beam of light are received by the beam shaping component at substantially the same position, such as at a surface of the beam shaping component or within the beam shaping component (e.g., 1 mm or more within the beam shaping component). The first beam of light and the second beam of light are received by the beam shaping component at different angles of incidence, such as angles which vary by 1 arc minute or more, such as by 5 arc minute or more, such as by 10 arc minute or more and including by 25 arc minute or more.

To propagate the first beam of light from the first laser and the second beam of light from the second laser to the beam shaping component, systems according to some embodiments include a mirror component that includes a first mirror and a second mirror positioned to propagate light from the first mirror to a beam combiner. The second mirror is in some instances positioned to orthogonally propagate light from the first mirror. In other instances, the second mirror is positioned to propagate light orthogonally to the beam of light from the laser. In some instances, the first beam of light and second beam of light are combined with a dichroic beam combiner. Light from the beam combiner is, in certain instances, propagated directly (i.e., with no further optical changes) to the beam shaping component.

In some embodiments, the beam shaping component is configured to produce an output beam of light having an intensity profile for the first beam of light and the second beam of light having a beam intensity profile at the center that is from 75% to 99.9% of the intensity at the edges along the horizontal axis. In some instances, the beam intensity profile at the center of the output beam of light is from 90% to 99.9% of the intensity at the edges of the output beam of light along the horizontal axis. In certain instances, the beam shaping component is configured to generate an output beam of light having a top hat intensity profile along the horizontal axis. In other instances, the beam shaping component is configured to generate an output beam of light having a super Gaussian intensity profile along the horizontal axis. The beam shaping component in these embodiments may include diffractive optics, refractive optics or an array of lenses, such as a cylindrical lens array. In some embodiments, the beam shaping component is a laser line generator lens, such as a Powell lens. In some instances, the laser line generator lens is positioned to receive two or more different beams of light at substantially the same position at different angles of incidence and generate output beams of light having beam profile intensities at the center that is from 75% to 99.9% of the intensity at the edges along the horizontal axis. In certain embodiments, the subject systems include only a single Powell lens and are configured to receive two or more different beams of light at substantially the same position at different angles of incidence and generate output beams of light having a predetermined beam intensity profile along the horizontal axis (e.g., a top hat beam intensity profile).

In some embodiments, the beam shaping component is configured to produce an output beam of light having an intensity profile for the first beam of light and the second beam of light having a beam intensity profile at the center that is from 75% to 99.9% of the intensity at the edges along the vertical axis. In some instances, the beam intensity profile at the center of the output beam of light is from 90% to 99.9% of the intensity at the edges of the output beam of light along the vertical axis. In certain instances, the beam shaping component is configured to generate an output beam of light having a top hat intensity profile along the vertical axis. In other instances, the beam shaping component is configured to generate an output beam of light having a super Gaussian intensity profile along the vertical axis. The beam shaping component in these embodiments may include diffractive optics, refractive optics or an array of lenses, such as a cylindrical lens array. In some embodiments, the beam shaping component is a Powell lens. In some instances, the Powell lens is positioned to receive two or more different beams of light at substantially the same position at different angles of incidence and generate output beams of light having beam profile intensities at the center that is from 75% to 99.9% of the intensity at the edges along the vertical axis. In certain embodiments, the beam shaping component is configured to generate output beams of light having a Gaussian distribution along a vertical axis.

In some embodiments, the subject systems include a flow stream configured to propagate a sample in a flow stream. In certain instances, the flow stream includes a core stream and a laminating sheath stream. In these instances, the beam shaping component according to some embodiments is configured to generate an output beam of light having a beam profile that is from 50% to 99.9% of the spatial width of the core stream along a horizontal axis. In some instances, the beam shaping component is configured to generate an output beam of light having an intensity profile that is substantially the same across from 50% to 99.9% of the core stream along a horizontal axis. In certain instances, the beam shaping component is configured to generate an output beam of light having a top hat intensity profile across from 50% to 99.9% of the core stream along a horizontal axis. In other instances, the beam shaping component is configured to generate an output beam of light having a super Gaussian intensity profile across from 50% to 99.9% of the core stream along a horizontal axis.

The subject systems include two or more lasers. In embodiments, the lasers may independently be continuous or pulsed lasers. In some instances, one or more lasers are continuous diode lasers, such as an ultraviolet diode laser, a visible diode laser and a near-infrared diode laser. For example, the diode laser may be a 405 nm diode laser or a 488 nm diode laser. In other instances, one or more lasers are pulsed lasers, such as a solid-state laser, for example a Nd:YAG pulsed laser or Ti sapphire pulsed laser. In some instances, systems include a plurality of lasers. In some embodiments, the beam shaping component is configured to generate an output beam of light having a predetermined intensity profile along a horizontal axis from the plurality of lasers. In certain embodiments, the beam shaping component is configured to generate a plurality of output beams of light having substantially the same intensity profile along a horizontal axis. In one example, the beam shaping component is configured to generate a plurality of output beams of light having a top hat intensity profile along the horizontal axis. In another example, the beam shaping component is configured to generate a plurality of output beams of light having a super Gaussian intensity profile along the horizontal axis. In other embodiments, the beam shaping component is configured to generate a first output laser beam having a first intensity profile along a horizontal axis; and a second output laser beam having a second intensity profile along the horizontal axis. In these embodiments, one or more of the output laser beams may have a top hat intensity profile along the horizontal axis. In other embodiments, one or more of the output laser beams may have a super Gaussian intensity profile along the horizontal axis.

In some embodiments, systems include a photosensor, such as a light detector for measuring light from a sample in a flow stream. The sensor may be configured to detect forward scattered light, side scattered light, transmitted light, emitted light or a combination thereof. Light signals may be detected continuously or in periodic intervals. In some embodiments, the sensor is a position sensing detector, such as a quadrant photodiode or a photodiode array composed of a plurality of detectors. Among the plurality of detectors may be one or more solid-state detectors, such as avalanche photodiodes. In certain instances, the detector array is composed of a plurality of solid state detectors, such as an array of avalanche photodiodes.

Aspects of the present disclosure also include methods for irradiating a sample in a flow stream with an output beam of light having a predetermined intensity profile along a horizontal axis that is generated from a first beam of light and a second beam of light. Methods according to certain embodiments include irradiating a sample in a flow stream with a first beam of light and a beam of light through a beam shaping component that receives the first beam of light and the second beam of light at substantially the same position from different angles of incidence. Light from a sample in the flow stream may be detected by forward scattered light, side scattered light, transmitted light, emitted light or a combination thereof. In certain embodiments, methods include multi-photon counting of photons from light from the sample in the flow stream. In certain embodiments, the sample in the flow stream includes cells and the methods include characterizing one or more cells or extracellular vesicles of the cells in the sample. Characterizing the extracellular vesicles of the cells may include identifying the type of extracellular vesicles in the cells and/or determining the size of the extracellular vesicles in the cells.

Kits including one or more components of the subject systems are also provided. Kits according to certain embodiments include one or more lasers, a mirror component having a first mirror and a second mirror positioned to propagate light from the first mirror to a beam combiner; and a beam shaping component configured to generate from the first beam of light and the second beam of light an output laser beam of light having a predetermined intensity profile along a horizontal axis from the first laser and the second laser. Kits may also include a support stage for coupling to one or more of the mirrors as well as to the beam shaping component. In certain embodiments, the support stage includes a motor, such as a step motor. The subject kits may also include other beam shaping components such as, for example, a focusing lens, a collimator, beam splitter, a wavelength separator or a combination thereof. Kits may also include optical relay systems for propagating light from the sample in the flow stream to the detector, such as a free-space light relay system or fiber optics (e.g., a fiber optics light relay bundle).

BRIEF DESCRIPTION OF THE FIGURES

The invention may be best understood from the following detailed description when read in conjunction with the accompanying drawings. Included in the drawings are the following figures:

FIG. 4A depicts the intensity profile of the beams of light when the plurality of beams of light are received at the same position on the beam shaping component (e.g., Powell lens). FIG. 4B depicts the intensity profile of the beams of light when the plurality of beams of light are received at the same position on the beam shaping component and at different angles of incidence. FIG. 4C depicts a zoomed in view of the intensity profile when the plurality of beams of light are received at the same position on the beam shaping component.

FIG. 4D depicts beam profile with different input beam sizes. FIG. 4E depicts normalized intensities of the beam profiles with different input beam sizes.

FIG. 5A-5B depict irradiation of a flow stream by three lasers through a single beam component according to certain embodiments. FIG. 5A depicts beams of light propagated through a single beam shaping component and onto different positions along the longitudinal axis of a flow stream. FIG. 5B depicts a cross section of a flow stream irradiated by three lasers through a single beam shaping component according to certain embodiments.

DETAILED DESCRIPTION

Figure 1:
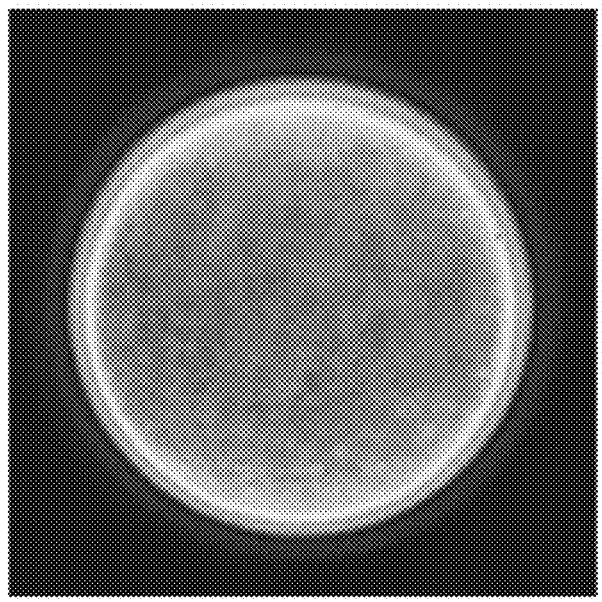
FIG. 1 depicts a comparison between an output beam of light having a Gaussian intensity profile and an output beam of light having a top hat intensity profile according to certain embodiments. A depicts the beam spot of an output beam of light having a Gaussian intensity profile and a plot of the relative intensity of the beam of light as a function of the distance from the optical axis. B depicts the beam spot of an output beam of light having a top hat intensity profile and a plot of the relative intensity of the beam of light as a function of the distance from the optical axis.
Figure 1:
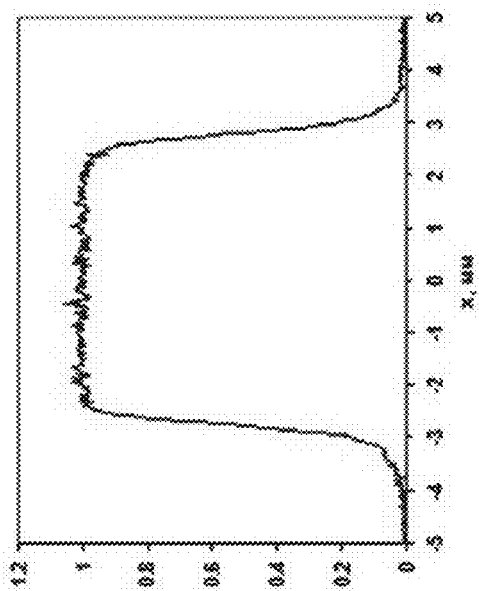
Figure 1:
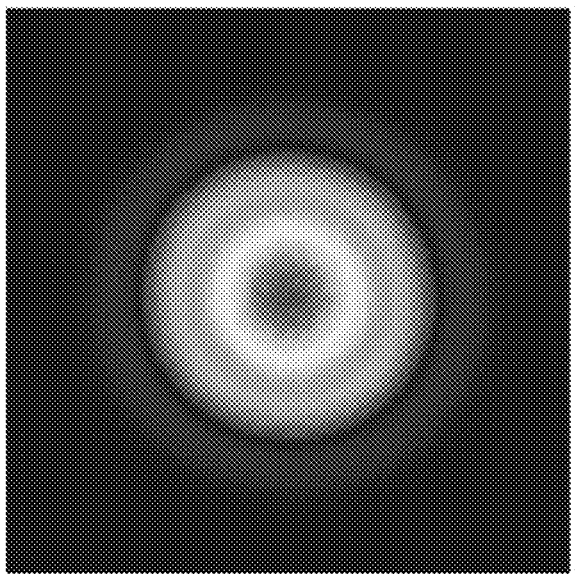
Figure 1:
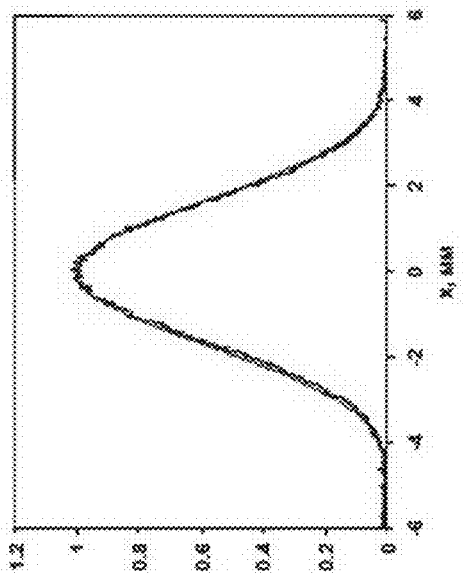

Aspects of the present disclosure include systems with multiple lasers having modified beam profiles. Systems according to certain embodiments include a first laser that produces a first beam of light, a second laser that produces a second beam of light and a beam shaping component that receives the first beam of light and the second beam of light at substantially the same position from different angles of incidence and is configured to generate from the first beam of light and the second beam of light an output beam of light having a predetermined intensity profile along a horizontal axis. Methods for irradiating a sample in a flow stream with the output beam of light are also described. Kits having one or more lasers and a beam shaping component configured to generate from a first beam of light and a second beam of light an output beam of light having a predetermined intensity profile along a horizontal axis are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides systems with multiple lasers having modified beam profiles. In further describing embodiments of the disclosure, systems having two or more lasers and a beam shaping component configured to generate from the two or more lasers output beams of light having a predetermined intensity profile along a horizontal axis are first described in greater detail. Next, methods for irradiating a sample in a flow stream with the output beams of light are described. Kits having one or more lasers and a beam shaping component configured to an output beam of light having a predetermined intensity profile along a horizontal axis are also provided.

Systems for Producing an Output Laser Beam Laser Beams with a Predetermined Intensity Profile Aspects of the disclosure include systems for producing a laser beam having a modified intensity profile. Systems according to certain embodiments include a first laser that produces a first beam of light, a second laser that produces a second beam of light and a beam shaping component that receives the first beam of light and the second beam of light at substantially the same position from different angles of incidence and is configured to generate from the first beam of light and the second beam of light an output beam of light having a predetermined intensity profile along a horizontal axis. The term "beam shaping" is used herein in its conventional sense to mean that the beam profile of the light from each of the lasers along one or more of the horizontal axis and vertical axis is changed as desired. As described in greater detail below, the beam shaping component is, in embodiments, configured to generate a beam of light having a predetermined intensity profile along one or more of a horizontal axis and a vertical axis. The beam shaping component is configured to generate an output beam of light having a beam profile having an intensity at the center that is from 75% to 99.9% of the intensity at the edges along one or more of the horizontal axis and the vertical axis. In some embodiments, the beam shaping component is configured to generate an output beam of light having a beam profile having a substantially constant intensity from each edge to the center, such as where the intensity across the horizontal axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the horizontal axis of the beam profile varies by 0.001% or less. In other embodiments, the beam shaping component is configured to generate an output beam of light having a beam profile having a substantially constant intensity from each edge to the center, such as where the intensity across the vertical axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the vertical axis of the beam profile varies by 0.001% or less.

The intensity of the output beams of light can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors. In some instance, to determine the intensity profile of an output beam of light, the relative intensity of each output laser beam of light is plotted as a function of the distance from the optical axis (along an orthogonal horizontal axis) of the output beam of light to determine the intensity profile at the point of irradiation. In certain embodiments, the deviation in relative intensity at predetermined distances from the optical axis is calculated to determine whether the beam profile of the output beam of light exhibits a substantially constant intensity from each edge to the center along the horizontal axis. In other embodiments, the deviation in relative intensity is calculated across the entire horizontal axis of the beam profile of the output beam of light to determine if the output beam of light exhibits a substantially constant intensity from the edge to the center.

In certain embodiments, the beam shaping component is configured to generate an output beam of light having a top hat intensity profile along the horizontal axis. The term "top hat" is used herein in its conventional sense to refer to a beam of irradiation (e.g., light) having near uniform fluence (energy density) along one or more axes orthogonal to the optical axis of the beam of irradiation. In embodiments, output beams of light having a top hat intensity profile exhibit little to no deviation in relative intensity from each edge to the center along the horizontal axis, where beams of light having a top hat intensity profile of interest have an intensity at the center that is from 95% to 99.9% of the intensity at the edges along the horizontal axis, such as 96% to 99.5% and including from 98% to 99% of the intensity at the edges along the horizontal axis.

In other embodiments, the beam shaping component is configured to generate an output beam of light having a super Gaussian intensity profile along the horizontal axis. The term "super Gaussian" is used herein in its conventional sense to refer to a beam of irradiation having an energy density that is greater slightly greater at the center of the beam profile along one or more axes orthogonal to the optical axis of the beam of irradiation. In embodiments, output beams of light having a super Gaussian intensity profile exhibit greater fluence at the edges of the beam along the horizontal axis than a corresponding Gaussian intensity profile. In one example, beams of light having a super Gaussian intensity profile have an intensity at the edges that is from 70%-90% of the intensity at the center of the beam along the horizontal axis, such as from 75%-85% and including an intensity at the edges that is from 80%-90% of the intensity at the center of the beam along the horizontal axis.

FIG. 1 depict a comparison between an output beam of light having a Gaussian intensity profile and an output beam of light having a top hat intensity profile according to certain embodiments. A depicts the beam spot of an output beam of light having a Gaussian intensity profile and a plot of the relative intensity of the beam of light as a function of the distance from the optical axis. B depicts the beam spot of an output beam of light having a top hat intensity profile and a plot of the relative intensity of the beam of light as a function of the distance from the optical axis. As shown in FIG. 1, the Gaussian shaped beam exhibits greater relative intensity near the optical axis with decreasing intensity at the edges of the output beam of light. On the other hand, the top hat shaped beam exhibits near uniform fluence where the energy of the beam of light at the optical axis is equivalent to the energy at the edges of the beam of light.

In the subject systems, the beam shaping component may be any convenient beam shaper that modifies the beam profile of a light beam across one or more of the horizontal axis and the vertical axis. As described herein, the horizontal and vertical axis refer to the axes that are orthogonal to the optical axis (i.e., beam path) of the beam of light and in embodiments, form the X-Y plane of the beam profile. As described in greater detail below, the horizontal axis of output beams of light is orthogonal to the longitudinal axis of the flow stream (e.g., a flow stream in a flow cytometer) and the vertical axis of output beams of light is parallel to the longitudinal axis of the flow stream. In some embodiments, the beam shaping component of interest modifies the beam profile of a propagated light beam across the horizontal axis. In other embodiments, the beam shaping component of interest modifies the beam profile of a propagated light beam across the vertical axis. In yet other embodiments, the beam shaping component of interest modifies the beam profile of a propagated light beam across the horizontal axis and the vertical axis. The beam shaping component in these embodiments may include diffractive optics, refractive optics or an array of lenses, such as a cylindrical lens array. In some embodiments, the beam shaping component is an aspheric cylindrical lens having cylindrical axes oriented at right angles, such as a laser line generator lens (e.g., a Powell lens). Examples of laser line generator lenses include, but are not limited to, those described in U.S. Pat. Nos. 4,826,299; 5,283,694; 7,400,457 and 7,329,860, the disclosures of which are herein incorporated by reference.

Beam shaping components of interest (e.g., cylindrical lens, laser line generator lens, Powell lens) may be formed from any suitable material including but not limited to glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7). In some embodiments, the beam shaping component has a transparency window of from 150 nm to 5 μm; from 180 nm to 8 μm, from 185 nm to 2.1 μm, from 200 nm to 6 μm, from 200 nm to 11 μm, from 250 nm to 1.6 μm, from 350 nm to 2 μm, from 600 nm to 16 μm, from 1.2 μm to 8 μm, from 2 μm to 16 μm or some other wavelength range. The refractive index of beam shaping components of interest may vary, ranging from 1 to 3, such as from 1.1 to 2.9, such as from 1.2 to 2.8, such as from 1.3 to 2.7, such as from 1.4 to 2.6, such as from 1.5 to 2.7, such as from 1.6 to 2.6, such as from 1.7 to 2.5, such as from 1.8 to 2.4 and including from 1.9 to 2.3.

In some instances, the beam shaping component is a Powell lens that is positioned to receive two or more different beams of light at substantially the same position at different angles of incidence and generate output beams of light having beam profile intensities at the center that is from 75% to 99.9% of the intensity at the edges along the horizontal axis. Depending on the lasers in the subject system, the Powell lens may have a diameter that varies, ranging from 2 mm to 15 mm, such as from 2.5 mm to 14.5 mm, such as from 3 mm to 14 mm, such as from 3.5 mm to 13.5 mm, such as from 4 mm to 13 mm, such as from 4.5 mm to 12.5 mm, such as from 5 mm to 12 mm, such as from 5.5 mm to 11.5 mm, such as from 6 mm to 11 mm and including from 7 mm to 10 mm. The fan angle of the Powell lens may also vary, ranging from 0.1° to 90°, such as from 0.5° to 85°, such as from 1° to 80°, such as from 5° to 75°, such as from 10° to 70°, such as from 15° to 65° and including a Powell lens having a fan angle of from 20° to 60°. In certain embodiments, the subject systems include only a single beam shaping optical component (e.g., a single Powell lens) and are configured to receive two or more different beams of light at substantially the same position at different angles of incidence and generate output beams of light having a predetermined beam intensity profile along the horizontal axis (e.g., a top hat beam intensity profile).

In embodiments, the generated output beams of light retain the power intensity of each laser received by the beam shaping component, such that power from each laser is reduced by 10% or less, such as 9% or less, such as by 8% or less, such as by 7% or less, such as by 6% or less, such as by 5% or less, such as by 4% or less, such as by 3% or less, such as by 2% or less, such as by 1% or less, such as 0.5% or less, such as by 0.1% or less, such as by 0.01% of less, such as by 0.001% or less and including by 0.0001% or less. The generated output power of beams of light according to embodiments can be determined by any convenient protocol, including but not limited to, measuring the incident and output power with a power sensor (e.g., a thermopile power sensor), optical power sensor, energy meter, digital laser photometer, a laser diode detector, a CCD or CMOS photosensor, among other types of photodetectors. To determine the change in power of the generated output beams of light, incident light on the beam shaping component may be measured with one or more of the aforementioned power meters, such as with a handheld optical or thermopile power meter and compared with the laser power of light propagated through the beam shaping component (i.e., the power of the generated output beam of light).

In some embodiments, the beam shaping component is configured to generate an output beam of light having a beam profile where each beam of light has an intensity at the center that is from 50% to 99.9% of the intensity at the edges along the horizontal axis, such as from 55% to 99%, such as from 60% to 95%, such as from 65% to 90%, such as from 70% to 85% and including having an intensity at the center that is from 75% to 80% of the intensity at the edges along the horizontal axis. In certain embodiments, the beam shaping component is configured to generate an output beam of light having a beam profile where each beam of light has an intensity at the center that is from 90% to 99.9% of the intensity at the edges along the horizontal axis. In embodiments, the 80% line length of the output beams of light exhibit substantial uniformity, such as where the normalized intensity of the laser light along the 80% line length of each output laser beam along the horizontal axis deviates by 5% or less, such as by 4.5% or less, such as by 4% or less, such as by 3.5% or less, such as by 3% or less, such as by 2.5% or less, such as by 2% or less, such as by 1.5% or less, such as by 1% or less, such as by 0.5% or less, such as by 0.1% or less, such as by 0.01% or less, such as by 0.001% or less and including by 0.0001% or less. The 80% line length in each output beam of light along the horizontal axis exhibits deviation in contained power by 5% or less, such as by 4.5% or less, such as by 4% or less, such as by 3.5% or less, such as by 3% or less, such as by 2.5% or less, such as by 2% or less, such as by 1.5% or less, such as by 1% or less, such as by 0.5% or less, such as by 0.1% or less, such as by 0.01% or less, such as by 0.001% or less and including by 0.0001% or less.

In some embodiments, the beam shaping component is configured to generate an output beam of light having a beam profile where each beam of light has an intensity at the center that is from 50% to 99.9% of the intensity at the edges along the vertical axis, such as from 55% to 99%, such as from 60% to 95%, such as from 65% to 90%, such as from 70% to 85% and including having an intensity at the center that is from 75% to 80% of the intensity at the edges along the vertical axis. In certain embodiments, the beam shaping component is configured to generate an output beam of light having a beam profile where each beam of light has an intensity at the center that is from 90% to 99.9% of the intensity at the edges along the vertical axis. In embodiments, the 80% line length of the output beams of light exhibit substantial uniformity, such as where the normalized intensity of the laser light along the 80% line length of each output laser beam along the vertical axis deviates by 5% or less, such as by 4.5% or less, such as by 4% or less, such as by 3.5% or less, such as by 3% or less, such as by 2.5% or less, such as by 2% or less, such as by 1.5% or less, such as by 1% or less, such as by 0.5% or less, such as by 0.1% or less, such as by 0.01% or less, such as by 0.001% or less and including by 0.0001% or less. The 80% line length in each output beam of light along the vertical axis exhibits deviation in contained power by 5% or less, such as by 4.5% or less, such as by 4% or less, such as by 3.5% or less, such as by 3% or less, such as by 2.5% or less, such as by 2% or less, such as by 1.5% or less, such as by 1% or less, such as by 0.5% or less, such as by 0.1% or less, such as by 0.01% or less, such as by 0.001% or less and including by 0.0001% or less.

As described above, the subject beam shaping component is configured to generate output beams of light having a beam profile having which exhibits a substantially constant intensity from each edge to the center along one or more of the horizontal axis and the vertical axis. In some embodiments, the incident beams of light from the two or more lasers exhibit beam profiles that are not substantially constant from the edge to the center. In some instances, the incident beams of light from the two or more lasers independently exhibit a beam profile where the intensity at the center of the beam is greater than the intensity at the edges of the beam, such as by 10% or more, such as by 15% or more, such as by 25% or more, such as by 50% or more, such as by 75% or more, such as by 99% or more, such as by 2-fold or more, such as by 3-fold or more and including by 5-fold or more. In other embodiments, the incident beams of light from the two or more lasers independently exhibit a beam profile where the intensities at the edges are greater than the intensity at the center, such as by such as by 10% or more, such as by 15% or more, such as by 25% or more, such as by 50% or more, such as by 75% or more, such as by 99% or more, such as by 2-fold or more, such as by 3-fold or more and including by 5-fold or more. In some embodiments, the incident beams of light exhibit a Gaussian beam profile.

In embodiments, systems include two or more lasers, each outputting a beam of light that is received by the beam shaping component at substantially the same position. By "substantially the same position" is meant that the each beam of light is propagated through a common position in the beam shaping component, where in certain instances the beams of light are received by the beam shaping component at positions that are within 1 mm or less of each other, such as 0.5 mm or less, such as 0.1 mm or less, such as 0.05 mm or less, such as 0.01 mm or less, such as 0.005 mm or less, such as 0.001 mm or less and including within 0.0001 mm or less of each other. In other instances, each of the beams of light from the two or more lasers overlap at the beam shaping component, such as an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In some embodiments, the beam shaping component receives the beams of light from the two or more lasers at the same position at a surface of the beam shaping component. By "surface" of the beam shaping component is mean the space where the beam shaping component comes into contact with the external environment and may extend from about 0.0001 mm to about 0.1 mm into the beam shaping component, such as from 0.0005 mm to about 0.09 mm, such as from 0.001 mm to about 0.08 mm, such as from about 0.005 mm to about 0.07 mm, such as from about 0.01 mm to about 0.05 mm into the beam shaping component. In some instances, the subject systems include 2 lasers and the beam shaping component receives a first beam of light from the first laser and a second beam of light from the second laser at the same position at the surface of the beam shaping component. In other instances, the subject systems include 3 lasers and the beam shaping component receives a first beam of light from the first laser, a second beam of light from the second laser and a third beam of light from the third laser at the same position at the surface of the beam shaping component. In yet other instances, the subject systems include 4 lasers and the beam shaping component receives a first beam of light from the first laser, a second beam of light from the second laser, a third beam of light from the third laser and a fourth beam of light from the fourth laser at the same position at the surface of the beam shaping component. In still other instances, the subject systems include 4 lasers and the beam shaping component receives a first beam of light from the first laser, a second beam of light from the second laser, a third beam of light from the third laser, a fourth beam of light from the fourth laser and a fifth beam of light from the fifth laser at the same position at the surface of the beam shaping component.

In other embodiments, the beam shaping component receives the beams of light from the two or more lasers at the same position within the beam shaping component. For example, the beam shaping component may be positioned to receive the beams of light from the two or more lasers at a position that is 0.1 mm or more within the beam shaping component, such as 0.2 mm or more, such as 0.3 mm or more, such as 0.4 mm or more, such as 0.5 mm or more, such as 0.6 mm or more, such as 0.7 mm or more, such as 0.8 mm or more, such as 0.9 mm or more, such as 1 mm or more, such as 1.5 mm or more, such as 2 mm or more and including 2.5 mm or more within the beam shaping component. Depending on the size of the beam shaping component, the beam shaping component may be positioned to receive the beams of light from the two or more lasers at a position that is 15 mm or less within the beam shaping component, such as 14 mm or less, such as 13 mm or less, such as 12 mm or less, such as 11 mm or less, such as 10 mm or less, such as 9 mm or less, such as 8 mm or less, such as 7 mm or less, such as 6 mm or less, such as 5 mm or less, such as 4 mm or less, such as 3 mm or less, such as 2 mm or less and including 1 mm or less. In some instances, the subject systems include 2 lasers and the beam shaping component receives a first beam of light from the first laser and a second beam of light from the second laser at the same position that is 0.1 mm or more within the beam shaping component. In other instances, the subject systems include 3 lasers and the beam shaping component receives a first beam of light from the first laser, a second beam of light from the second laser and a third beam of light from the third laser at the same position that is 0.1 mm or more within the beam shaping component. In yet other instances, the subject systems include 4 lasers and the beam shaping component receives a first beam of light from the first laser, a second beam of light from the second laser, a third beam of light from the third laser and a fourth beam of light from the fourth laser at the same position that is 0.1 mm or more within the beam shaping component. In still other instances, the subject systems include 4 lasers and the beam shaping component receives a first beam of light from the first laser, a second beam of light from the second laser, a third beam of light from the third laser, a fourth beam of light from the fourth laser and a fifth beam of light from the fifth laser that is 0.1 mm or more within the surface of the beam shaping component.

Light from each laser impinges onto the beam shaping component at an incident angle that varies, ranging from 0.1° to 60°, such as from 5° to 55°, such as from 10° to 50° and including from 15° to 45°. In embodiments, the beam shaping component receives the beams of light from each of the lasers at different angles of incidence, where the angle of incidence on the beam shaping component for each beam of light differs by 1 arc minute or more, such as 2 arc minute or more, such as 3 arc minute or more, such as 5 arc minute or more, such as 10 arc minute or more, such as 15 arc minute or more, such as 20 arc minute or more, such as 25 arc minute or more, such as 50 arc minute or more, such as 75 arc minute or more, such as 100 arc minute or more, such as 150 arc minute or more and including where the angle of incidence on the beam shaping component by each laser differs by 250 arc minute or more. Depending on the type of beam shaping component, the angle of incidence on the beam shaping component for the beams of light differ from each other, in some embodiments, by 500 arc minute or less, such as by 450 arc minute or less, such as 400 arc minute or less, such as 350 arc minute or less, such as 300 arc minute or less, such as 250 arc minute or less, such as 200 arc minute or less, such as 150 arc minute or less, such as 100 arc minute or less, such as 50 arc minute or less and including 25 arc minute or less.

As described in greater detail below, each output beam of light propagated through the beam shaping component may be projected onto different positions of a flow stream. For example, each output beam of light may be projected onto a flow stream at different positions along the longitudinal axis of the flow stream (e.g., spaced apart along the longitudinal axis by 1 mm or more, 2 mm or more, as described in detail below). Depending on the refractive index of the beam shaping component and the angle of incidence, the refracting angle of each output beam of light may vary, ranging from 0.1° to 60°, such as from 5° to 55°, such as from 10° to 50° and including from 15° to 45°. In embodiments, the refracting angle of each output beam of light may differ from each other by 1 arc minute or more, such as 2 arc minute or more, such as 3 arc minute or more, such as 5 arc minute or more, such as 10 arc minute or more, such as 15 arc minute or more, such as 20 arc minute or more, such as 25 arc minute or more, such as 50 arc minute or more, such as 75 arc minute or more, such as 100 arc minute or more, such as 150 arc minute or more and including where the angle of incidence on the beam shaping component by each laser differs by 250 arc minute or more. In some instances, the refracting angle of each output beam of light differs from each other by 500 arc minute or less, such as 400 arc minute or less, such as 300 arc minute or less, such as 250 arc minute or less, such as 200 arc minute or less, such as 150 arc minute or less, such as 100 arc minute or less, such as 75 arc minute or less, such as 50 arc minute or less, such as 25 arc minute or less, such as 20 arc minute or less, such as 15 arc minute or less, such as 10 arc minute or less, such as 5 arc minute or less, such as 3 arc minute or less, such as 2 arc minute or less and including 1 arc minute or less.

In embodiments, the beam shaping component may be spatially adjustable. The beam shaping component may be adjusted to change the horizontal position of the beam shaping component, the vertical position of the beam shaping component, the angle of orientation of the beam shaping component or a combination thereof. In some embodiments, the beam shaping component is configured to be spatially adjustable and configured to change the horizontal position of the beam shaping component (e.g., in an X-Y plane). For example, the horizontal position of the beam shaping component may be moved by 0.0001 mm or more, such as by 0.0005 mm or more, such as by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more and including moving the horizontal position of the beam shaping component by 25 mm or more. Depending on the size of the beam shaping component, the horizontal position of the beam shaping component may be configured to be moved, in some embodiments, by 50 mm or less, such as by 40 mm or less, such as by 30 mm or less, such as by 20 mm or less, such as by 10 mm or less, such as by 9 mm or less, such as by 8 mm or less, such as by 7 mm or less, such as by 6 mm or less, such as by 5 mm or less, such as by 4 mm or less, such as by 3 mm or less, such as by 2 mm or less and including by 1 mm or less.

In other embodiments, the beam shaping component is spatially adjustable and configured to change the vertical position of the beam shaping component. For example, the vertical position of the beam shaping component may be moved by 0.0001 mm or more, such as by 0.0005 mm or more, such as by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more and including moving the vertical position of the beam shaping component by 25 mm or more. Depending on the size of the beam shaping component, the vertical position of the beam shaping component may be configured to be moved, in some embodiments, by 50 mm or less, such as by 40 mm or less, such as by 30 mm or less, such as by 20 mm or less, such as by 10 mm or less, such as by 9 mm or less, such as by 8 mm or less, such as by 7 mm or less, such as by 6 mm or less, such as by 5 mm or less, such as by 4 mm or less, such as by 3 mm or less, such as by 2 mm or less and including by 1 mm or less.

In other embodiments, the beam shaping component is spatially adjustable and configured to change the angle of orientation of the beam shaping component. For example, the beam shaping component may be a rotated (e.g., in the X-Y plane, X-Z plane or Y-Z plane) by 0.0001° or more, such as by 0.0005° or more, such as by 0.001° or more, such as by 0.005° or more, such as by 0.01° or more, such as by 0.05° or more, such as by 0.1° or more, such as by 0.2° or more, such as by 0.3° or more, such as by 0.4° or more, such as by 0.5° or more, such as by 1° or more, such as by 2° or more, such as by 3° or more, such as by 4° or more, such as by 5° or more, such as by 10° or more, such as by 15° or more, such as by 20° or more, such as by 25° or more, such as by 30° or more and including by rotating the beam shaping component by 45° or more. The beam shaping component may be configured to be rotated, in certain embodiments, by 60° or less, such as by 55° or less, such as by 50° or less, such as by 45° or less, such as by 40° or less, such as by 35° or less, such as by 30° or less, such as by 20° or less, such as by 15° or less, such as by 10° or less, such as by 5° or less and including by 1° or less.

In certain embodiments, the beam shaping component is configured to be rotated (e.g., in the X-Y plane, X-Z plane or Y-Z plane) by 0.001 arc minute or more, such as by 0.005 arc minute or more, such as by 0.01 arc minute or more, such as by 0.05 arc minute or more, such as by 0.1 arc minute or more, such as by 0.5 arc minute or more, such as by 1 arc minute or more, such as by 2 arc minute or more, such as by 3 arc minute or more, such as by 4 arc minute or more, such as by 5 arc minute or more, such as by 6 arc minute or more, such as by 7 arc minute or more, such as by 8 arc minute or more, such as by 9 arc minute or more and including by 10 arc minute or more.

In certain instances, the beam shaping component is configured for fine tuning the laser beam position on a flow stream and is configured to rotate (e.g., in the X-Y plane, X-Z plane or Y-Z plane) by 5 arc minute or less, such as by 4.5 arc minute or less, such as by 4 arc minute or less, such as by 3.5 arc minute or less, such as by 3 arc minute or less, such as by 2.5 arc minute or less, such as by 2 arc minute or less, such as by 1.5 arc minute or less, such as by 1 arc minute or less, such as by 0.5 arc minute or less, such as by 0.1 arc minute or less, such as by 0.05 arc minute or less, such as by 0.01 arc minute or less, such as by 0.005 arc minute or less and including by 0.001 arc minute or less.

The beam shaping component is configured to be spatially adjustable continuously or in discrete increments, such as in increments of 0.001 mm or more, such as 0.005 mm or more, such as 0.01 mm or more, such as 0.05 mm or more, such as 0.1 mm or more, such as 0.5 mm or more, such as 1 mm or more, such as 2 mm or more and including displacing the beam shaping component along the horizontal axis in increments of 5 mm or more. In some embodiments, the beam shaping component may be configured to be displaced in increments of 25 mm or less, such as 20 mm or less, such as 15 mm or less, such as 10 mm or less, such as 5 mm or less, such as 4.5 mm or less, such as 4 mm or less, such as 3.5 mm or less, such as 3 mm or less, such as 2.5 mm or less, such as 2 mm or less, such as by 1.5 mm or less, such as 1 mm or less and including increments of 1 mm or less In another example, the beam shaping component is configured to be displaced along the vertical axis in discrete increments, such as in increments of 0.001 mm or more, such as 0.005 mm or more, such as 0.01 mm or more, such as 0.05 mm or more, such as 0.1 mm or more, such as 0.5 mm or more, such as 1 mm or more, such as 2 mm or more and including displacing the beam shaping component along the vertical axis in increments of 5 mm or more. In some embodiments, the beam shaping component is configured to be displaced in increments of 25 mm or less, such as 20 mm or less, such as 15 mm or less, such as 10 mm or less, such as 5 mm or less, such as 4.5 mm or less, such as 4 mm or less, such as 3.5 mm or less, such as 3 mm or less, such as 2.5 mm or less, such as 2 mm or less, such as by 1.5 mm or less, such as 1 mm or less and including increments of 1 mm or less.

In yet another example, the angle of orientation of the beam shaping component is adjustable in discrete increments, such as in increments of 0.1° or more, such as 0.2° or more, such as 0.3° or more, such as 0.4° or more, such as 0.5° or more, such as 1° or more, such as 2° or more, such as 3° or more, such as 4° or more and including 5° or more. In other embodiments, the beam shaping component is adjustable in discrete increments, such as in increments of 10° or less, such as 9° or less, such as 8° or less, such as 7° or less, such as 6° or less, such as 5° or less, such as 4° or less, such as 3° or less, such as 2° or less, such as 1° or less, such as 0.5° or less and including 0.1° or less.

In still another example, the beam shaping component is configured for rotation in discrete increments, such as in increments of 0.0001 arc minute or more, such as 0.0005 arc minute or more, such as 0.001 arc minute or more, such as 0.005 arc minute or more, such as 0.01 arc minute or more, such as 0.05 arc minute or more, such as 0.1 arc minute or more, such as 0.5 arc minute or more, such as 1 arc minute or more, such as 2 arc minute or more, such as 3 arc minute or more, such as 4 arc minute or more and including 5 arc minute or more. In other embodiments, the beam shaping component is configured for rotation in discrete increments, such as in increments of 15 arc minute or less, such as 12.5 arc minute or less, such as 10 arc minute or less, such as 9 arc minute or less, such as 8 arc minute or less, such as 7 arc minute or less, such as 6 arc minute or less, such as 5 arc minute or less, such as 4 arc minute or less, such as 3 arc minute or less, such as 2 arc minute or less and including 1 arc minute or less.

In some embodiments, the beam shaping component is movable (e.g., manually, mechanically or with a motor-driven displacement device). In other embodiments, the beam shaping component is coupled to a support stage that is movable. In some instance, the beam shaping component is configured to be moved manually. In other instances, the beam shaping component is configured to be moved mechanically, such as being directly coupled to a suitable actuator, such as mechanical leadscrew assembly or a mechanically operated geared translation device or where the mechanical leadscrew assembly or a mechanically operated geared translation device are coupled to the support stage. In yet other instances, the beam shaping component is configured to be moved with a motor-driven displacement device, such as where the beam shaping component is coupled to a motor actuated displacement stage, motor driven leadscrew assembly, motor-operated geared actuation device employing a stepper motor, servo motor, brushless electric motor, brushed DC motor, micro-step drive motor, high resolution stepper motor, among other types of motors.

In some embodiments, systems are configured to be spatially adjustable to generate an output beam of light having a spatial width that is from 50% to 99.9% of the width of a flow stream along a horizontal axis, such as from 55% to 99%, such as from 60% to 95%, such as from 65% to 90%, such as from 70% to 85% and including where the output beam of light has a spatial width that is from 75% to 95% of the width of a flow stream along a horizontal axis. In certain embodiments, as described in greater detail below, the flow stream has a core stream and a laminating sheath stream and the systems are configured to be spatially adjustable to generate an output beam of light having a spatial width that is from 50% to 99.9% of the width of the core stream along a horizontal axis, such as from 55% to 99%, such as from 60% to 95%, such as from 65% to 90%, such as from 70% to 85% and including where the output beam of light has a spatial width that is from 75% to 95% of the width of the core stream along a horizontal axis. In these embodiments, the beam shaping component is configured to generate an output beam of light having an intensity profile that is substantially the same across from 50% to 99.9% of the spatial width of the flow stream along a horizontal axis. In certain embodiments, the beam shaping component is configured to generate an output beam of light having an intensity profile that is substantially the same across from 50% to 99.9% of the spatial width of the core stream along a horizontal axis. In some instances, the beam shaping component is configured to be adjustable to generate an output beam of light having a top hat intensity profile across the core stream along a horizontal axis. In other instances, the beam shaping component is configured to be adjustable to generate an output beam of light having a super Gaussian intensity profile across the core stream along a horizontal axis.

In certain embodiments, the subject systems are configured to dynamically adjust the output beams to have a width that is from 50% to 99.9% of the spatial width of the flow stream. In these embodiments, the laser, one or more optical adjustment components or the beam shaping component may be adjusted to generate an output beam having a desired spatial width. In one example, the spatial with of the output beam is increased by 5% or more, such as by 10% or more, such as by 25% or more, such as by 50% or more, such as by 75% or more and including by 90% or more to achieve the desired incident width on the flow stream. In another example, the spatial with of the output beam is decreased by 5% or more, such as by 10% or more, such as by 25% or more, such as by 50% or more, such as by 75% or more and including by 90% or more to achieve the desired incident width on the flow stream. In certain embodiments, the output beams of light are adjusted to match the spatial width of the flow stream. For example, the output beams of light may be adjusted to match the spatial width of the core stream of a flow stream.

Light from each laser may be propagated directly to the beam shaping component or through one or more optical adjustment components. The term "optical adjustment" is used herein in its conventional sense to refer to any device that is capable of changing the spatial width irradiation or some other characteristic of irradiation from the laser light, such as for example, irradiation direction, wavelength, beam width, beam intensity, focal point and pulse width. Optical adjustment protocols may be any convenient device which adjusts one or more characteristics of the laser, including but not limited to lenses, mirrors, filters, fiber optics, wavelength separators, pinholes, slits, collimating protocols and combinations thereof. In certain embodiments, systems of interest include one or more focusing lenses. The focusing lens, in one example may be a de-magnifying lens. In another example, the focusing lens is a magnifying lens. In other embodiments, systems of interest include one or more mirrors. In still other embodiments, systems of interest include fiber optics. In some embodiments, the beams of light from each laser are combined by a beam combiner, such as a dichroic mirror beam combiner. In these embodiments, the beam combiner combines the light beams from each laser and propagates the light to the beam shaping component.

In certain embodiments, light from each laser is propagated to the beam shaping component via a mirror component. In these embodiments, the mirror component may include a first mirror and a second mirror positioned to propagate light from the first mirror to the beam shaping component. In embodiments, the second mirror is positioned to propagate light from the first mirror at an angle that varies with respect to the first mirror, such as from 1° to 90°, such as from 5° to 85°, such as from 10° to 80°, such as from 15° to 75°, such as from 20° to 70°, such as from 25° to 65° and including from 30° to 60°. In certain instances, the second mirror is positioned to orthogonally propagate light from the first mirror. In other embodiments, the second mirror is positioned to propagate light from the first mirror at an angle that varies with respect to the laser, such as from 1° to 90°, such as from 5° to 85°, such as from 10° to 80°, such as from 15° to 75°, such as from 20° to 70°, such as from 25° to 65° and including from 30° to 60°. In certain instances, the second mirror is positioned to propagate light orthogonally with respect to the laser. In some embodiments, the second mirror is also a beam combiner configured to combine the beams of light from the two or more lasers. In these embodiments, the second mirror may be a dichroic mirror, which selectively passes wavelengths of light as desired.

In some embodiments, the subject systems do not include a prism for combining light from the two or more lasers and propagating the combined beams of light to the beam shaping component. In these embodiments, the optical adjustment components for combining two or more beams of light from the plurality of lasers is prism-less and may employ, as described above, a mirror component for propagating and combining light from each laser to the beam shaping component.

In some embodiments, optical adjustment components (e.g., one or more of the first mirror and second mirror of the mirror component) are movable. In some instances, the optical adjustment component is movable in two dimensions, such as in an X-Y plane. In other instances, the optical adjustment component is movable in three dimensions. In certain embodiments, the optical adjustment component is one or more of the mirrors of the mirror component that is configured to be moved to adjust the position of irradiation onto the beam shaping component. In some embodiments, the one or more mirrors may be configured to be moved in an X-Y plane. In other embodiments, the one or more mirrors are configured to change angles, such as tilted with respect the laser or the beam shaping component. For example, systems may be configured to change the position of irradiation on the beam shaping component by changing the angle of the mirror with respect to laser by 5° or more, such as by 10° or more, such as by 15° or more, such as by 20° or more, such as by 30° or more, such as by 45° or more, such as by 60° or more and including by 75° or more.

Where the optical adjustment component (e.g., one or more mirrors) is configured to move, the optical adjustment component may be configured to be moved continuously or in discrete intervals. In some embodiments, movement of the optical adjustment component is continuous. In other embodiments, the optical adjustment component is movable in discrete intervals, such as for example in 0.01 micron or greater increments, such as 0.05 micron or greater, such as 0.1 micron or greater, such as 0.5 micron or greater, such as 1 micron or greater, such as 10 micron or greater, such as 100 microns or greater, such as 500 microns or greater, such as 1 mm or greater, such as 5 mm or greater, such as 10 mm or greater and including 25 mm or greater increments.

Any displacement protocol may be employed to move the optical adjustment component structures, such as coupled to a movable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

In embodiments, the beam shaping component receives light from two or more lasers, such as 3 or more lasers, such as 4 or more lasers, such as 5 or more lasers, such as 6 or more lasers and including 10 or more lasers. Lasers of interest may include pulsed lasers or continuous wave lasers. The type and number of lasers may vary and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, systems include irradiating the acousto-optic device with a dye laser, such as a stilbene, coumarin or rhodamine laser. In yet other instances, systems include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, systems include a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof. In still other instances, systems include a semiconductor diode laser, optically pumped semiconductor laser (OPSL), or a frequency doubled- or frequency tripled implementation of any of the above mentioned lasers.

Depending on the desired wavelengths of light produced in the output laser beam (e.g., for use in irradiating a sample in a flow stream), each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The lasers may include any combination of types of lasers. For example, in some embodiments, the subject systems include an array of lasers, such as an array having one or more gas lasers, one or more dye lasers and one or more solid-state lasers. In certain embodiments, systems of interest include an array of continuous wave diode lasers.

Each laser may be configured to irradiate continuously or in discrete intervals. In some instances, systems include lasers that are configured to irradiate continuously, such as continuous wave lasers. In other instances, systems of interest include lasers that are configured to irradiate at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where each laser is configured to irradiate at discrete intervals, systems may include one or more additional components to provide for intermittent irradiation with each laser. For example, the subject systems in these embodiments may include one or more laser beam choppers, manually or computer controlled beam stops for blocking and exposing the beam shaping component with each laser.

In some embodiments, systems include a flow cell configured to propagate a sample in a flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 µL/min or more, such as 2 µL/min or more, such as 3 µL/min or more, such as 5 µL/min or more, such as 10 µL/min or more, such as 15 µL/min or more, such as 25 µL/min or more, such as 50 µL/min or more and including 100 µL/min or more, where in some instances the rate of sample conveyed to the flow cell chamber by the sample injection port is 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more and including 100 µL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. In some instances, the rate of sample flow in the flow cell is 1 nL/min or more, such as 2 nL/min or more, such as 3 nL/min or more, such as 5 nL/min or more, such as 10 nL/min or more, such as 25 nL/min or more, such as 50 nL/min or more, such as 75 nL/min or more, such as 100 nL/min or more, such as 250 nL/min or more, such as 500 nL/min or more, such as 750 nL/min or more and including 1000 nL/min or more. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including rom 10 nL/min to 50 nL/min. In certain embodiments, the flow rate of the flow stream is from 5 nL/min to 6 nL/min.

Figure 2:
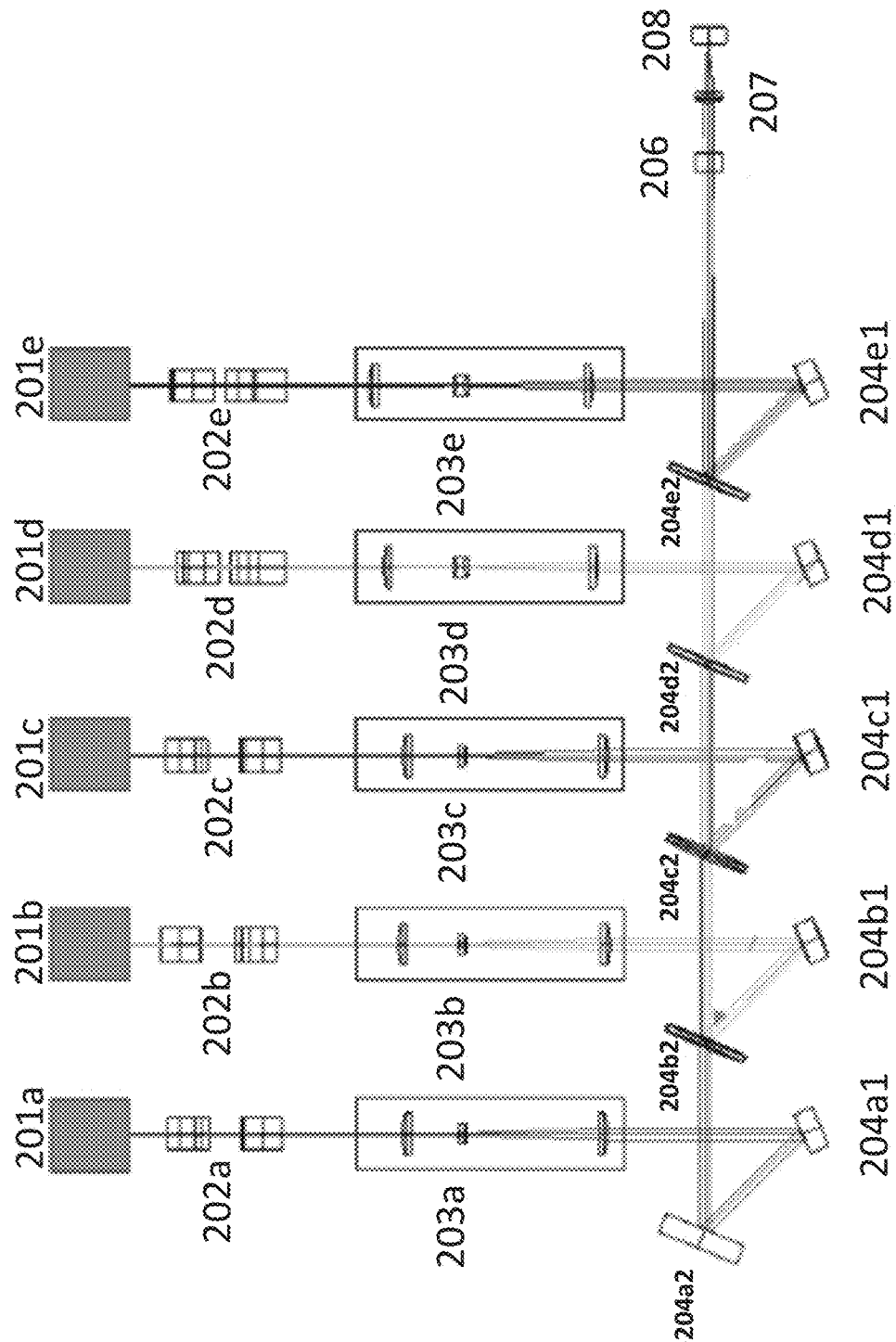
FIG. 2 depicts a system having a plurality of lasers and a single beam shaping component according to an embodiment.

FIG. 2 depicts a system having a plurality of lasers and a single beam shaping component according to certain embodiments. System 200 includes lasers 201a, 201b, 201c, 201d and 201e, each having a different wavelength of irradiation. Light from each of lasers 201a, 201b, 201c, 201d and 201e are irradiated through optical adjustment components 202a, 202b, 202c, 202d, 202e (e.g., prisms) and 203a, 203b, 203c, 203d, 203e (e.g., beam expanders, de-magnifying lenses) and propagated to a mirror component which each include a first mirror 204a1, 204b1, 204c1, 204d1 and 204e1 which reflects light from the laser to a second mirror 204a2, 204b2, 204c2, 204d2 and 204e2, which are also dichroic beam combiners. Light from the beam combiners is received by beam shaping component 206 which generates output beams of light having a modified intensity profile along a horizontal axis. The beam shaped output beams of light are focused with a focusing lens 207 onto flow cell 208.

Figure 3A:
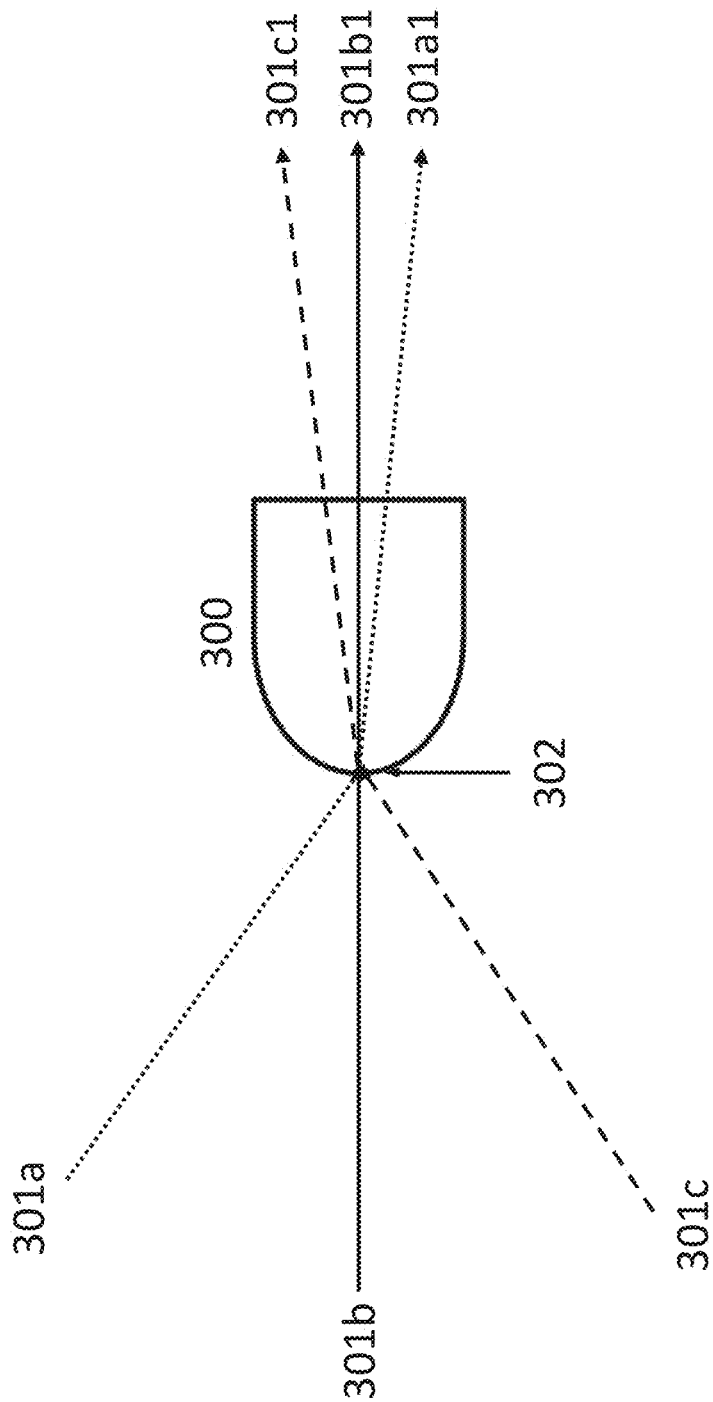
FIG. 3A depicts beams of light passing through a beam shaping component to generate output beams of light having a modified intensity profile along a horizontal axis according to an embodiment.
Figure 3B:
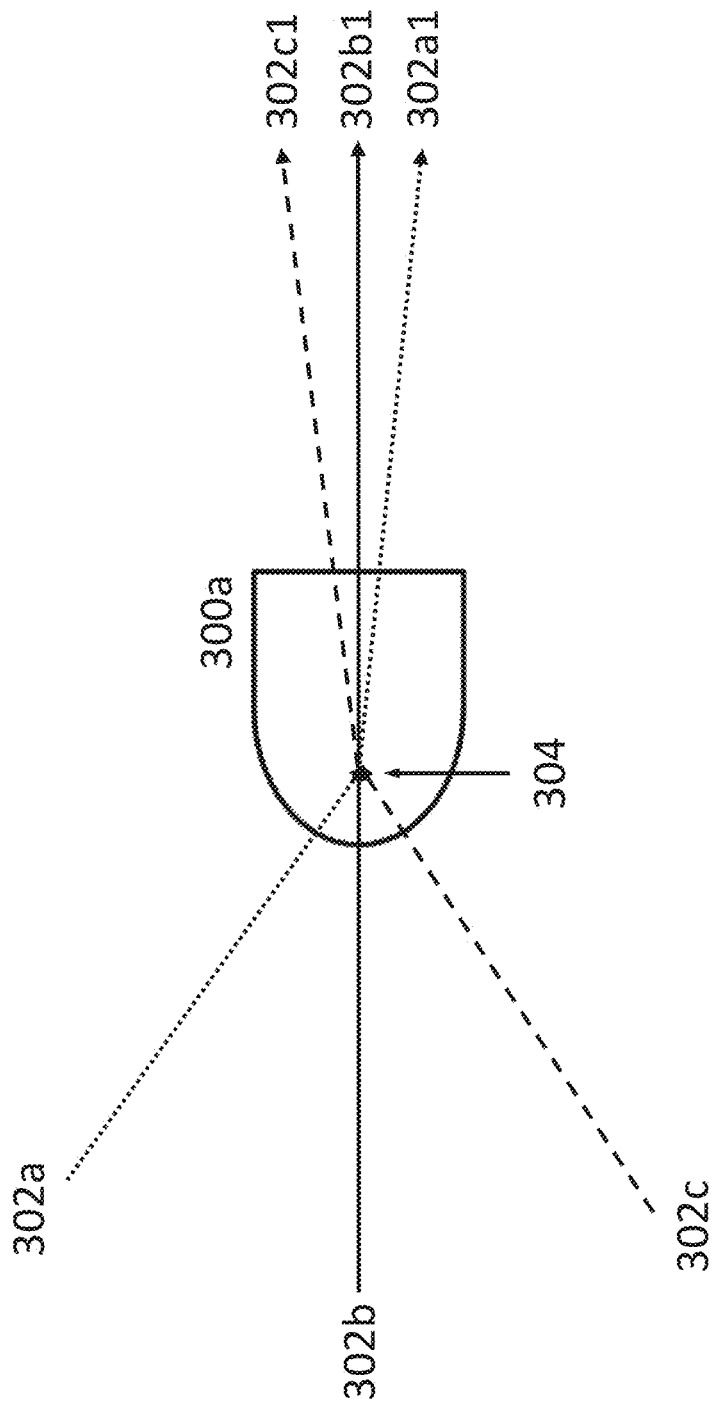
FIG. 3B depicts beams of light passing through a beam shaping component to generate output beams of light having a modified intensity profile along a horizontal axis according to an embodiment.

FIG. 3A depicts beams of light passing through a beam shaping component to generate output beams of light having a modified intensity profile along a horizontal axis according to certain embodiments. Beams of light 301a, 301b and 301c are received by beam shaping lens 300 at the same position at the surface 302 at different angles of incidence. Beam shaping lens 300 generates output beams of light 301a1, 301b1 and 301c1 having modified intensity profiles along the horizontal axis from beams of light 301a, 301b and 301c. FIG. 3B depicts beams of light passing through a beam shaping component to generate output beams of light having a modified intensity profile along a horizontal axis according to another embodiment. Beams of light 302a, 302b and 302c are received by beam shaping lens 300a at the same position within the beam shaping lens 304 at different angles of incidence. Beam shaping lens 300a generates output beams of light 302a1, 302b1 and 302c1 having modified intensity profiles along the horizontal axis from beams of light 302a, 302b and 302c.

Figure 4A:
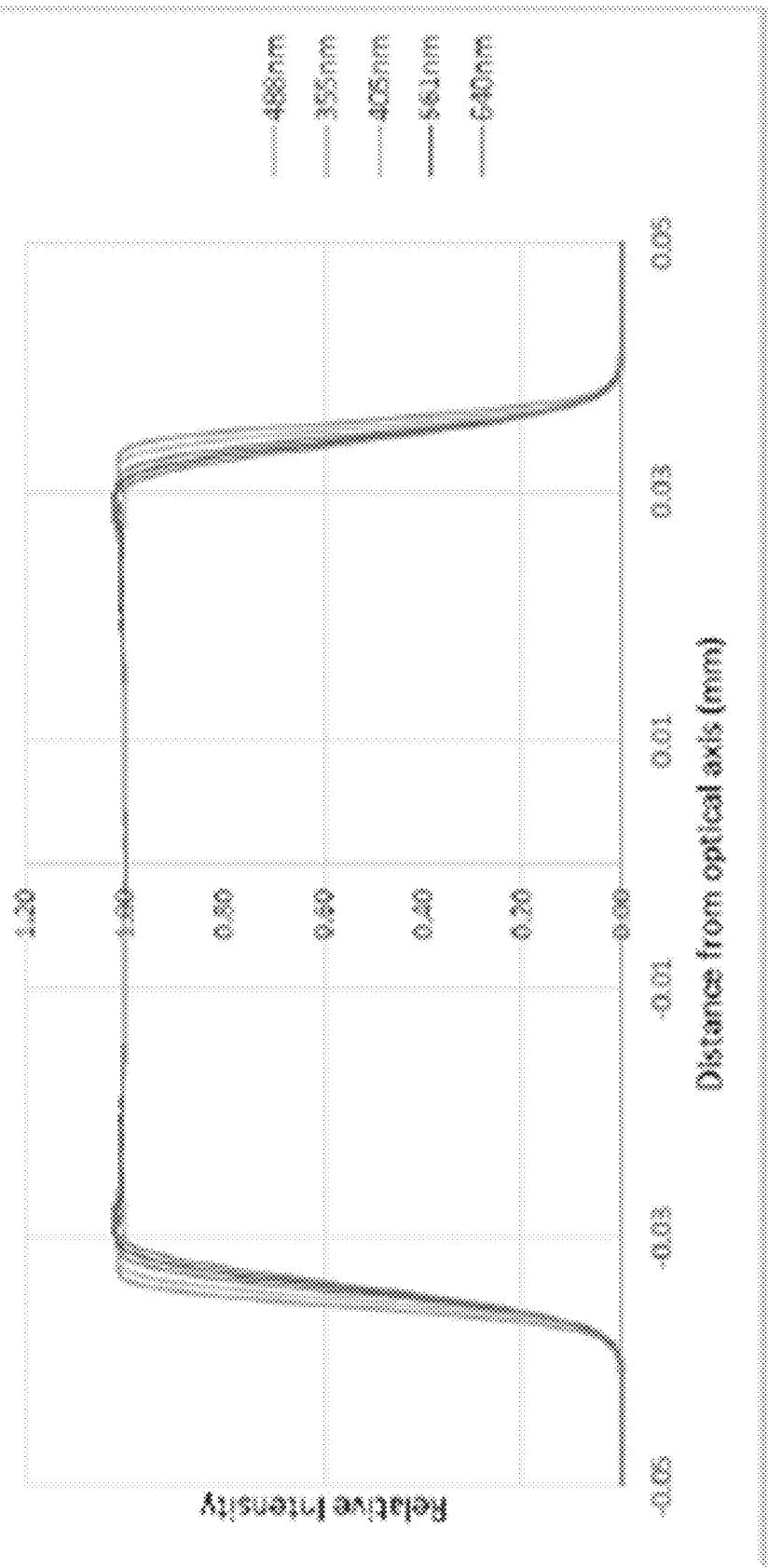
FIGS. 4A-4C depict the intensity profile of 5 lasers having different wavelengths propagated through a single beam shaping lens according to an embodiment.
Figure 4B:
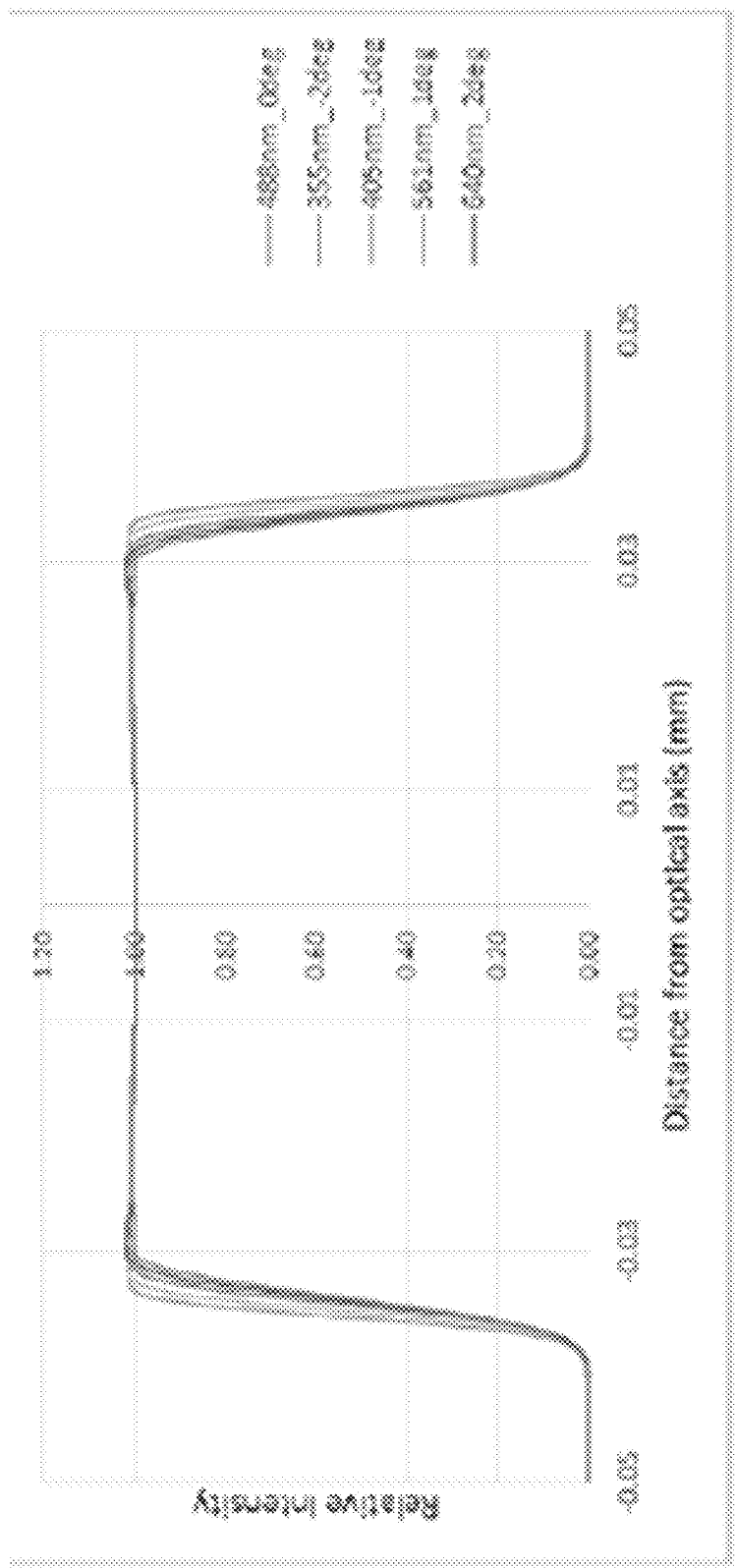
Figure 4C:
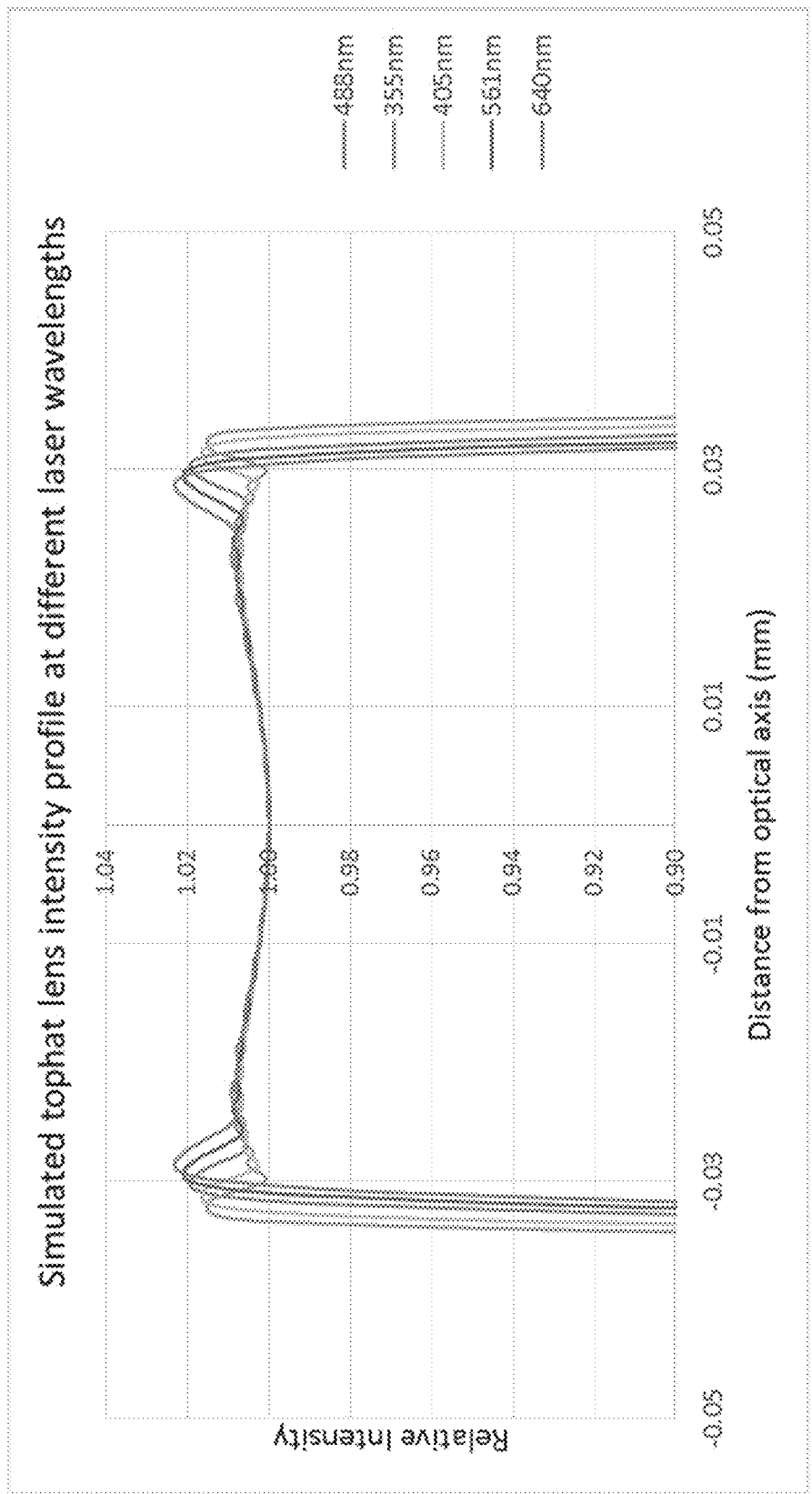

FIGS. 4A-4C depict the intensity profile of 5 lasers having different wavelengths propagated through a single beam shaping lens according to certain embodiments. FIG. 4A depicts the intensity profile of a 355 nm laser, a 405 nm laser, a 488 nm laser, a 561 nm laser and a 640 nm laser after propagation through a Powell lens. Each beam of light from the lasers is received by the Powell lens at the same position at the same angle of incidence. FIG. 4B depicts the intensity profile of a 355 nm laser, a 405 nm laser, a 488 nm laser, a 561 nm laser and a 640 nm laser after propagation through a Powell lens at the same position and at different angles of incidence. The beam of light from the 488 nm laser has an angle of incidence of 0 degrees; the beam of light from the 355 nm laser has an angle of incidence of −2 degrees; the beam of light from the 405 nm laser has an angle of incidence of −1 degrees; the beam of light from the 561 nm laser has an angle of incidence of 1 degrees and the beam of light from the 640 nm laser has an angle of incidence of 2 degrees. FIG. 4C depicts a zoomed in view of the intensity profile of the 355 nm laser, a 405 nm laser, a 488 nm laser, a 561 nm laser and a 640 nm laser after propagation through a Powell lens at the same position and at different angles of incidence, where the 80% line length of the output beams of light exhibit substantial uniformity, such as where the normalized intensity of the laser light along the 80% line length of each output laser beam along the vertical axis deviates by 1% or less. As shown in FIGS. 4A-4C, propagating the plurality of beams of light through the same position at different incidence angles provides for effective beam shaping, exhibiting a top hat intensity profile.

Figure 4D:
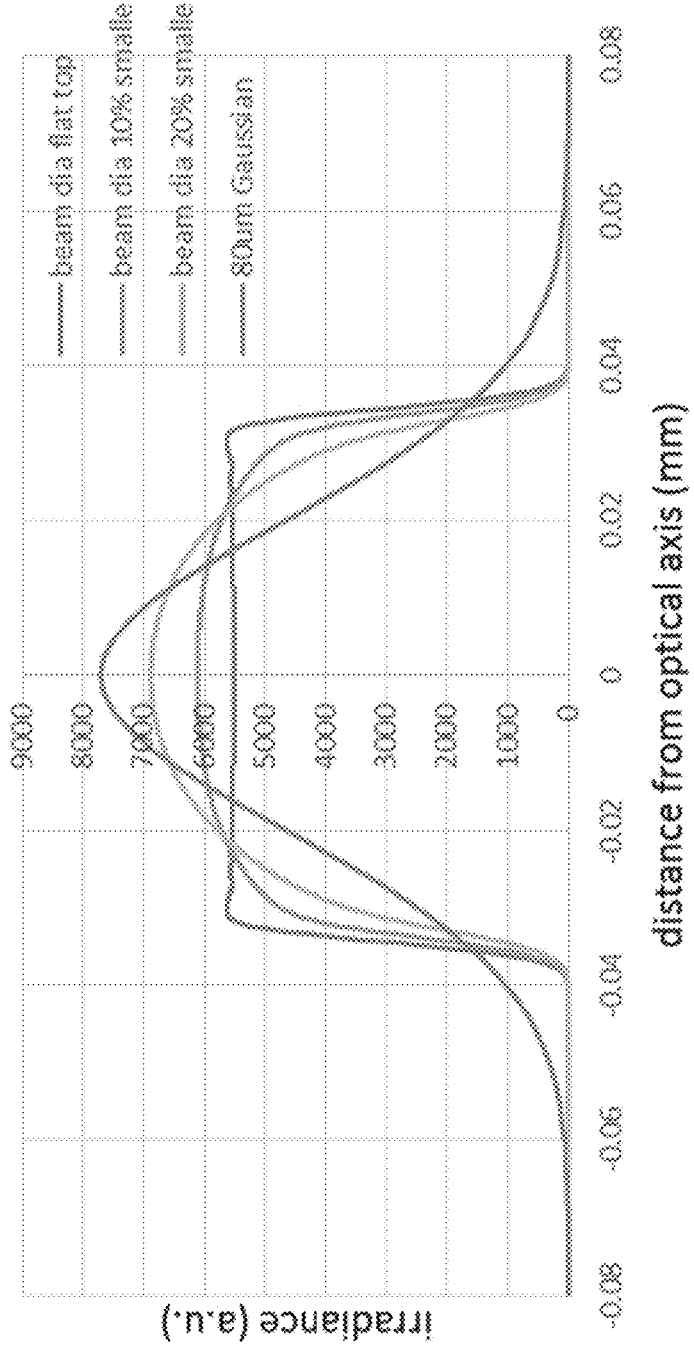
FIGS. 4D-4E depict the intensity profile of an output beam having a super Gaussian intensity profile along a horizontal axis according to certain embodiments.
Figure 4E:
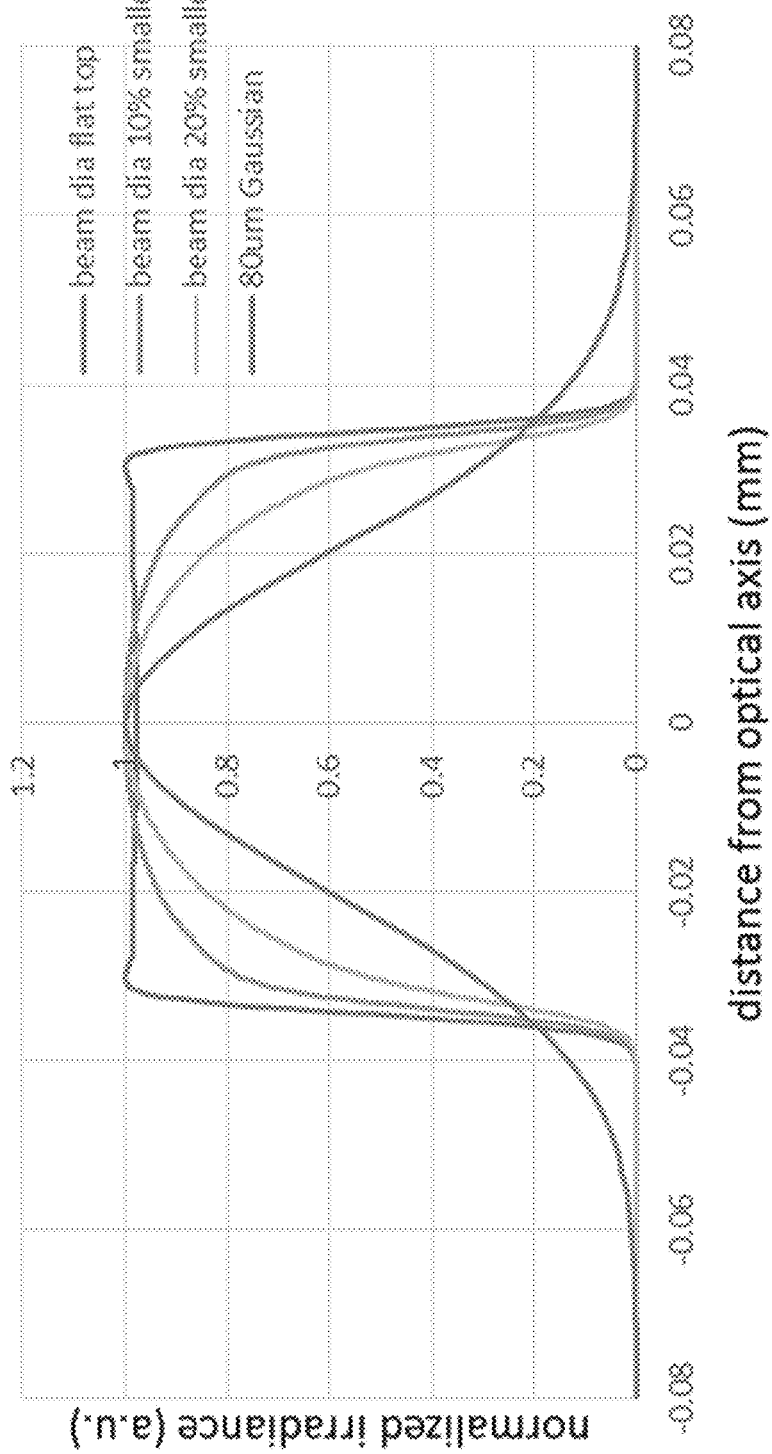

FIGS. 4D-4E depict the intensity profile of an output beam having a super Gaussian profile as compared to output beams having a Gaussian profile and a top hat profile according to certain embodiments. FIG. 4D depicts a comparison of the beam profiles of an output beam having a Gaussian profile overlayed with output beams having super Gaussian profiles where the beam diameter is reduced by 10% and 20%. FIG. 4D also depicts an output beam having a top hat profile generated with a Powell lens from a Gaussian input beam. FIG. 4E depicts the output beams of FIG. 4D with normal beam intensities to show a comparison of the intensity profiles of each type of beam along a horizontal axis.

In embodiments, the flow stream is irradiated with the output beams of light having the predetermined intensity profile along a horizontal axis. In some embodiments, the beam shaping component in configured to generate one or more output beams of light having spatial widths which extend across the flow stream, such as across 50% or more of the flow stream, such as 55% or more, such as 60% or more, such as 65% or more, such as 70% or more, such as 75% or more, such as 80% or more, such as 85% or more, such as 90% or more, such as 95% or more, such as 97% or more, such as 99% or more and including across 100% or more of the width (i.e., horizontal axis) of the flow stream. In certain embodiments, one or more of the output beams of light have a spatial width which extends beyond the width of the flow stream (i.e., extends more than 100% across the flow stream), such as a spatial width which extends beyond the width of the flow stream by 5% or more of the width of the flow stream, such as by 10% or more, such as by 15% or more, such as by 20% or more, such as by 25% or more, such as by 30% or more, such as by 35% or more, such as by 40% or more, such as by 45% or more and including where one or more of the output beams of light extend beyond the width of the flow stream by 50% or more. Depending on the width of the flow stream, the spatial width of each output beam of light may independently be 0.00001 mm or more, such as 0.00005 mm or more, such as 0.0001 mm or more, such as 0.0005 mm or more, such as 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more and including 25 mm or more. In some embodiments, the beam shaping component is configured to generate output beams of light having an intensity profile that is substantially the same across from 50% to 99.9% of the flow stream along a horizontal axis, such as from 55% to 95%, such as from 60% to 90%, such as from 65% to 85% and including generating output beams of light having an intensity profile that is substantially the same across from 70% to 80% of the flow stream along a horizontal axis.

As described above, the refractive angle of each output beam of light may vary depending on the refractive index of the beam shaping component as well as the angle of incidence. In embodiments, each output beam of light may be propagated onto different positions along the longitudinal axis of the flow stream from the beam shaping component. For example, each output beam of light may be propagated onto the flow stream at positions along the longitudinal axis that differ by 0.0001 mm or more, such as by 0.0005 mm or more, such as by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more, such as by 15 mm or more and including by 25 mm or more. In certain embodiments, each output beam of light may be propagated onto the flow stream at positions along the longitudinal axis that differ by 50 mm or less, such as by 25 mm or less, such as by 15 mm or less, such as by 10 mm or less, such as by 5 mm or less, such as by 4 mm or less, such as by 3 mm or less, such as by 2 mm or less, such as by 1 mm or less, such as by 0.5 mm or less, such as by 0.1 mm or less and including by 0.001 mm or less.

Figure 5A:
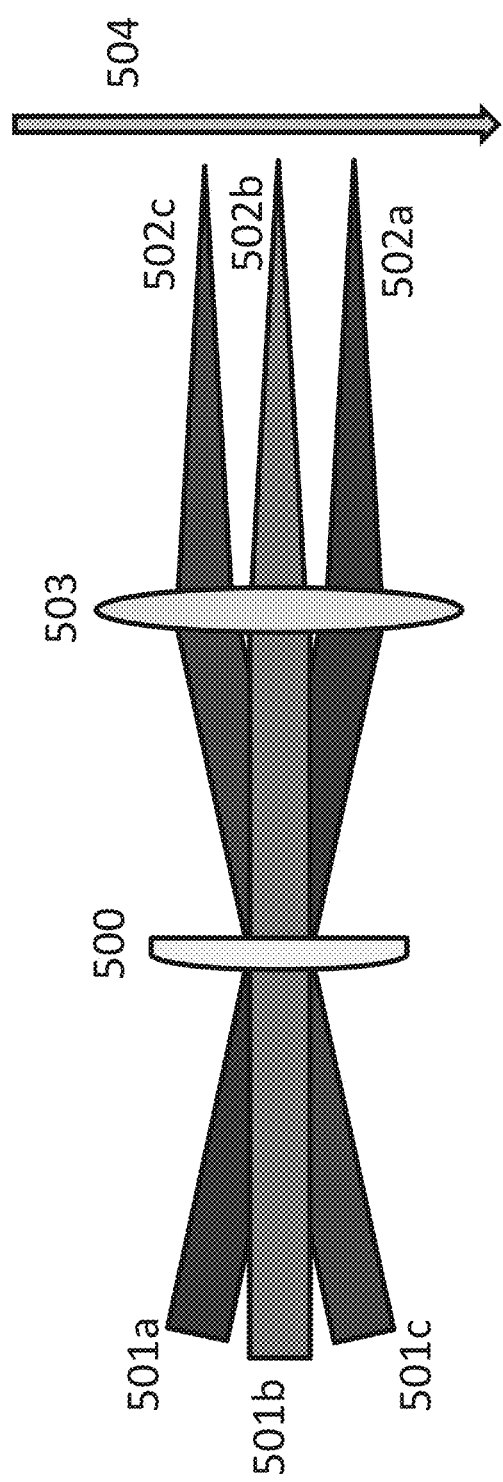

FIG. 5A depicts irradiation of a flow stream by three lasers through a single beam shaping component according to certain embodiments. Beams of light 501a, 501b and 501c are propagated through beam shaping component 500 at substantially the same position at different angles of incidence. Each of output beams of light 502a, 502b and 502c from incident beams of light 501a, 501b and 501c are focused by focusing lens 503 onto flow stream 504 at different positions along the longitudinal axis. FIG. 5B depicts a cross section of a flow stream irradiated by three lasers through a single beam shaping component according to certain embodiments. Each of the beamspots from output beams of light 502a, 502b and 502c are propagated onto flow stream 504 at different positions along the longitudinal axis. As shown in FIG. 5B, the beam spot for each output beam of light extends beyond the width of the flow stream.

Figure 6:
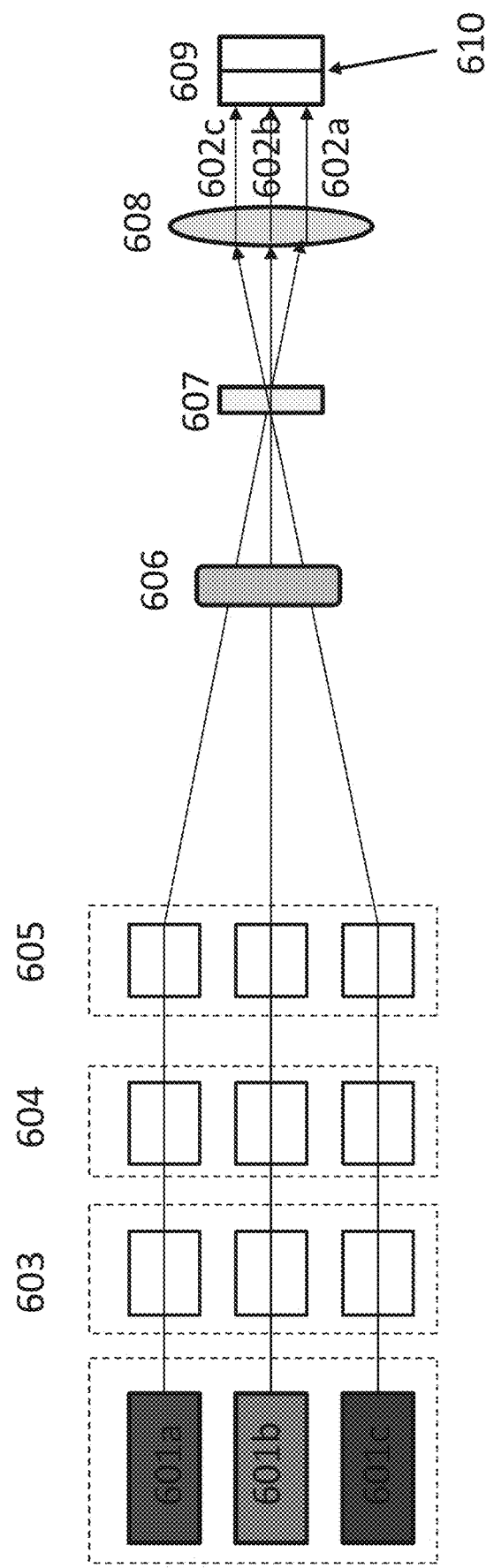
FIG. 6 depicts a system with three lasers configured to irradiate a flow stream through a single beam shaping component according to certain embodiments.

FIG. 6 depicts a system with three lasers configured to irradiate a flow stream through a single beam shaping component according to certain embodiments. Lasers 601a, 601b and 601c generate beams of light 602a, 602b and 602c which are propagated through optical adjustment components 603, 604 and 605 (e.g., focusing components, position and polarization control components) and 606 to beam shaping component 607. Each of beams of light 602a, 602b and 602c is received by beam shaping component 607 at the same position at different angles of incidence. Output beams of light from beam shaping component 607 are focused with focusing lens 608 onto flow cell 609 at different positions along the longitudinal axis of flow stream 610.

Systems of interest also include one or more photodetectors for detecting light signals from samples irradiated in the flow stream. Photodetectors in the subject systems may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the systems of interest include a photodiode array having more than one photodiode, such as two or more photodiodes, such as three or more, such as five or more and including 10 or more photodiodes, where each photodiode may have an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

The photodetector may be positioned at any suitable distance from the flow stream so long as a usable light signal is detectable. For example, detectors in the subject systems may be positioned 1 mm or more from the flow stream, such as 5 mm or more, such as 10 mm or more, such as 15 mm or more, such as 25 mm or more, such as 50 mm or more, such as 100 mm or more, such as 150 mm or more, such as 250 mm or more and including 500 mm or more from the flow stream. The detectors may also be positioned at any angle from the flow stream. For example, the detectors may be angled with respect to the vertical axis of the flow stream at from 10° to 90°, such as from 15° to 85°, such as from 20° to 80°, such as from 25° to 75° and including from 30° to 60°. In some instances, the one or more detectors are positioned at 30° to 60° with respect to the vertical axis of the flow stream.

In embodiments, systems are configured to detect forward scattered light, side scattered light, emitted light, transmitted light or a combination thereof. In certain embodiments, the light signals from the irradiated flow stream may be detected by one or more detectors configured as forward scatter detectors. In these embodiments, the forward scatter detectors are positioned on the opposite side of the flow stream from the light source and are positioned to collect and detect forward propagated (e.g., scattered) light. In other embodiments, the subject systems are configured to detect light signals from light propagated upstream by total internal reflectance. In certain embodiments, the subject systems are configured with flow cell nozzles as described in United States Patent Publication No. 2014/0320861 filed on Apr. 23, 2014, now abandoned the disclosure of which is herein incorporated by reference.

Aspects of the invention further include flow cytometric systems having multiple lasers and a beam shaping component configured to generate output beams of light having a predetermined beam profile intensity along a horizontal axis as described above. Suitable flow cytometry systems and methods for analyzing samples include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol*, 2010 December; 222(4):335-344; and Herbig, et al. (2007) *Crit Rev Ther Drug Carrier Syst.* 24(3): 203-255; the disclosures of which are incorporated herein by reference. In certain instances, flow cytometry systems of interest include BD Biosciences FACSCanto™ flow cytometer, BD Biosciences FACSVantage™, BD Biosciences FACSort™, BD Biosciences FACSCount™, BD Biosciences FACScan™, and BD Biosciences FACSCalibur™ systems, a BD Biosciences Influx™ cell sorter, BD Biosciences Jazz™ cell sorter and BD Biosciences Aria™ cell sorter or the like.

In some embodiments, the subject systems are flow cytometric systems, such those described in U.S. Pat. Nos. 3,960,449; 4,347,935; 4,667,830; 4,704,891; 4,770,992; 5,030,002; 5,040,890; 5,047,321; 5,245,318; 5,317,162; 5,464,581; 5,483,469; 5,602,039; 5,620,842; 5,627,040; 5,643,796; 5,700,692; 6,372,506; 6,809,804; 6,813,017; 6,821,740; 7,129,505; 7,201,875; 7,544,326; 8,140,300; 8,233,146; 8,753,573; 8,975,595; 9,092,034; 9,095,494 and 9,097,640; the disclosure of which are herein incorporated by reference in their entirety.

In certain embodiments, the subject systems are flow cytometric systems having an excitation module that uses radio-frequency multiplexed excitation to generate a plurality of frequency shifted beams of light. In these embodiments, the laser light generator may include a plurality of lasers and one or more acousto-optic components (e.g., an acoustooptic deflector, an acoustooptic frequency shifter) to generate a plurality of frequency shifted comb beams. One or more of the frequency shifted comb beams and local oscillator beams may be configured to be received by a beam shaping component as described here to produce one or more beams of frequency shifted light having a substantially constant intensity profile. In certain instances, the subject systems are flow cytometric systems having a laser excitation module as described in U.S. Pat. Nos. 9,423,353 and 9,784,661 and U.S. Patent Publication Nos. 2017/0133857 and 2017/0350803, the disclosures of which are herein incorporated by reference.

Methods for Irradiating a Sample in a Flow Stream

Aspects of the disclosure also include methods for irradiating a sample in a flow stream with two or more lasers having a predetermined intensity profile along a horizontal axis. In embodiments, methods include irradiating a sample in a flow stream with a first beam of light and a second beam of light through an optical adjustment component that receives the first beam of light and the second beam of light at substantially the same position from different angles of incidence and is configured to generate from the first beam of light and the second beam of light an output beam of light having a predetermined intensity profile along a horizontal axis. As discussed above, the beam shaping component is configured to change the beam profile of the light from each of the lasers along one or more of the horizontal axis and vertical axis. In practicing methods according to certain embodiments, the generated output beam of light has a beam profile having an intensity at the center that is from 75% to 99.9% of the intensity at the edges along the horizontal axis. In some embodiments, methods include irradiating a beam shaping component to generate an output beam of light having a beam profile having a substantially constant intensity from each edge to the center, such as where the intensity across the horizontal axis of the beam profile varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.05% or less, such as by 0.01% or less and including where the intensity across the horizontal axis of the beam profile varies by 0.001% or less. In certain embodiments, methods include irradiating a beam shaping component to generate an output beam of light having a top hat intensity profile along the horizontal axis.

In practicing the subject methods, irradiating the beam shaping component with each of the laser does not reduce the power of each output beam of light, such as where each output beam of light is reduced by 10% or less, such as 9% or less, such as by 8% or less, such as by 7% or less, such as by 6% or less, such as by 5% or less, such as by 4% or less, such as by 3% or less, such as by 2% or less, such as by 1% or less, such as 0.5% or less, such as by 0.1% or less, such as by 0.01% of less, such as by 0.001% or less and including by 0.0001% or less. In embodiments, the 80% line length of the output beams of light exhibit substantial uniformity, such as where the normalized intensity of the laser light along the 80% line length of each output laser beam deviates by 5% or less, such as by 4.5% or less, such as by 4% or less, such as by 3.5% or less, such as by 3% or less, such as by 2.5% or less, such as by 2% or less, such as by 1.5% or less, such as by 1% or less, such as by 0.5% or less, such as by 0.1% or less, such as by 0.01% or less, such as by 0.001% or less and including by 0.0001% or less. The 80% line length in each output beam of light exhibits deviation in contained power by 5% or less, such as by 4.5% or less, such as by 4% or less, such as by 3.5% or less, such as by 3% or less, such as by 2.5% or less, such as by 2% or less, such as by 1.5% or less, such as by 1% or less, such as by 0.5% or less, such as by 0.1% or less, such as by 0.01% or less, such as by 0.001% or less and including by 0.0001% or less.

The beam shaping component is irradiated by each laser at substantially the same position at different angles of incidence. As described above, each beam of light is propagated through a common position in the beam shaping component, where in certain instances the beams of light are received by the beam shaping component at positions that are within 1 mm or less of each other, such as 0.5 mm or less, such as 0.1 mm or less, such as 0.05 mm or less, such as 0.01 mm or less, such as 0.005 mm or less, such as 0.001 mm or less and including within 0.0001 mm or less of each other. In other instances, each of the beams of light from the two or more lasers overlap at the beam shaping component, such as an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In some instances, methods include irradiating the beam shaping component with each laser at the surface of the beam shaping component, such as at a position that is 0.0001 mm to about 0.1 mm from the surface of the beam shaping component, such as such as from 0.0005 mm to about 0.09 mm, such as from 0.001 mm to about 0.08 mm, such as from about 0.005 mm to about 0.07 mm, such as from about 0.01 mm to about 0.05 mm into the beam shaping component. In other instances, methods include irradiating the beam shaping component with each laser at a position within the beam shaping component, such as a position that is 0.1 mm or more within the beam shaping component, such as 0.2 mm or more, such as 0.3 mm or more, such as 0.4 mm or more, such as 0.5 mm or more, such as 0.6 mm or more, such as 0.7 mm or more, such as 0.8 mm or more, such as 0.9 mm or more, such as 1 mm or more, such as 1.5 mm or more, such as 2 mm or more and including 2.5 mm or more within the beam shaping component. Depending on the size of the beam shaping component, methods include irradiating the beam shaping component with each laser at a position within the beam shaping component that is 15 mm or less within the beam shaping component, such as 14 mm or less, such as 13 mm or less, such as 12 mm or less, such as 11 mm or less, such as 10 mm or less, such as 9 mm or less, such as 8 mm or less, such as 7 mm or less, such as 6 mm or less, such as 5 mm or less, such as 4 mm or less, such as 3 mm or less, such as 2 mm or less and including 1 mm or less.

Each laser irradiates the beam shaping component at different incident angles, such as at angles which range from 0.1° to 60°, such as from 5° to 55°, such as from 10° to 50° and including from 15° to 45°. In embodiments, methods include irradiating the beam shaping component at different incident angles, where the angle of incidence on the beam shaping component for each beam of light differs by 1 arc minute or more, such as 2 arc minute or more, such as 3 arc minute or more, such as 5 arc minute or more, such as 10 arc minute or more, such as 15 arc minute or more, such as 20 arc minute or more, such as 25 arc minute or more, such as 50 arc minute or more, such as 75 arc minute or more, such as 100 arc minute or more, such as 150 arc minute or more and including where the angle of incidence on the beam shaping component by each laser differs by 250 arc minute or more. In some embodiments, methods include irradiating the beam shaping component at different incident angles, such as at angles which differ by 500 arc minute or less, such as by 450 arc minute or less, such as 400 arc minute or less, such as 350 arc minute or less, such as 300 arc minute or less, such as 250 arc minute or less, such as 200 arc minute or less, such as 150 arc minute or less, such as 100 arc minute or less, such as 50 arc minute or less and including 25 arc minute or less.

The beam shaping component may be irradiated by each laser directly or through one or more optical adjustment components. As described above, optical adjustment may include changing the spatial width irradiation or some other characteristic of irradiation from the laser light, such as for example, irradiation direction, wavelength, beam width, beam intensity, focal point and pulse width. Optical adjustment protocols may be adjusting one or more characteristics of each laser, including but not limited to lenses, mirrors, filters, fiber optics, wavelength separators, pinholes, slits, collimating protocols and combinations thereof. In some embodiments, the beams of light from each laser are combined, such as by irradiating a beam combiner, such as a dichroic mirror beam combiner. In these embodiments, the beam combiner combines the light beams from each laser and propagates the light to the beam shaping component.

In certain embodiments, light from each laser is propagated to the beam shaping component through a mirror component. In these embodiments, the mirror component may include a first mirror and a second mirror positioned to propagate light from the first mirror to the beam shaping component. In embodiments, the second mirror is positioned to propagate light from the first mirror at an angle that varies with respect to the first mirror, such as from 1° to 90°, such as from 5° to 85°, such as from 10° to 80°, such as from 15° to 75°, such as from 20° to 70°, such as from 25° to 65° and including from 30° to 60°. In certain instances, the second mirror is positioned to orthogonally propagate light from the first mirror. In other embodiments, the second mirror is positioned to propagate light from the first mirror at an angle that varies with respect to the laser, such as from 1° to 90°, such as from 5° to 85°, such as from 10° to 80°, such as from 15° to 75°, such as from 20° to 70°, such as from 25° to 65° and including from 30° to 60°. In certain instances, the second mirror is positioned to propagate light orthogonally with respect to the laser. In certain embodiments, the second mirror is also a beam combiner configured to combine one or more beams of light. In some instances, the second mirror is a dichroic beam combiner that selectively passes wavelengths of light as desired.

The beam shaping component may be irradiated by the laser at any suitable distance, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more from the beam shaping component. In practicing the subject methods according to certain embodiments, the beam shaping component may be irradiated by each laser continuously or in discrete intervals. In some instances, methods include irradiating the flow stream through the beam shaping component continuously. In other instances, methods include irradiating the flow stream through the beam shaping component in discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the flow stream is irradiated through the beam shaping component at discrete intervals, the frequency of irradiation may depend such as on the concentration of components in the flow stream (e.g., cells, bead, non-cellular particles) as well as the flow rate of the flow stream.

In some embodiments, methods include spatially adjusting the beam shaping component. Spatially adjusting the beam shaping component according to embodiments may include changing the horizontal position of the beam shaping component, changing the vertical position of the beam shaping component, changing the angle of orientation (e.g., rotational angle) of the beam shaping component or a combination thereof. In some embodiments, the beam shaping component is spatially adjusted by changing the horizontal position of the beam shaping component (e.g., in an X-Y plane). For example, the horizontal position of the beam shaping component may be moved by 0.0001 mm or more, such as by 0.0005 mm or more, such as by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more and including moving the horizontal position of the beam shaping component by 25 mm or more. In some embodiments, methods include moving the horizontal position of the beam shaping component by 50 mm or less, such as by 40 mm or less, such as by 30 mm or less, such as by 20 mm or less, such as by 10 mm or less, such as by 9 mm or less, such as by 8 mm or less, such as by 7 mm or less, such as by 6 mm or less, such as by 5 mm or less, such as by 4 mm or less, such as by 3 mm or less, such as by 2 mm or less and including by 1 mm or less.

In other embodiments, the beam shaping component is spatially adjusted by changing the vertical position of the beam shaping component (e.g., along a longitudinal axis). For example, the vertical position of the beam shaping component may be moved by 0.0001 mm or more, such as by 0.0005 mm or more, such as by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more and including moving the vertical position of the beam shaping component by 25 mm or more (e.g., along a longitudinal axis). In some embodiments, methods include moving the vertical position of the beam shaping component by 50 mm or less, such as by 40 mm or less, such as by 30 mm or less, such as by 20 mm or less, such as by 10 mm or less, such as by 9 mm or less, such as by 8 mm or less, such as by 7 mm or less, such as by 6 mm or less, such as by 5 mm or less, such as by 4 mm or less, such as by 3 mm or less, such as by 2 mm or less and including by 1 mm or less.

In other embodiments, the beam shaping component is spatially adjusted by changing the angle of orientation of the beam shaping component. For example, the beam shaping component may be rotated (e.g., in the X-Y plane, X-Z plane or Y-Z plane) by 0.0001° or more, such as by 0.0005° or more, such as by 0.001° or more, such as by 0.005° or more, such as by 0.01° or more, such as by 0.05° or more, such as by 0.1° or more, such as by 0.2° or more, such as by 0.3° or more, such as by 0.4° or more, such as by 0.5° or more, such as by 1° or more, such as by 2° or more, such as by 3° or more, such as by 4° or more, such as by 5° or more, such as by 10° or more, such as by 15° or more, such as by 20° or more, such as by 25° or more, such as by 30° or more and including by rotating the beam shaping component by 45° or more. In some embodiments, the beam shaping component is rotated by 60° or less, such as by 55° or less, such as by 50° or less, such as by 45° or less, such as by 40° or less, such as by 35° or less, such as by 30° or less, such as by 20° or less, such as by 15° or less, such as by 10° or less, such as by 5° or less and including by 1° or less.

In certain embodiments, the beam shaping component is rotated (e.g., in the X-Y plane, X-Z plane or Y-Z plane) by 0.001 arc minute or more, such as by 0.005 arc minute or more, such as by 0.01 arc minute or more, such as by 0.05 arc minute or more, such as by 0.1 arc minute or more, such as by 0.5 arc minute or more, such as by 1 arc minute or more, such as by 2 arc minute or more, such as by 3 arc minute or more, such as by 4 arc minute or more, such as by 5 arc minute or more, such as by 6 arc minute or more, such as by 7 arc minute or more, such as by 8 arc minute or more, such as by 9 arc minute or more and including by 10 arc minute or more. In certain instances, methods include spatially adjusting the position of the beam shaping component to fine tune the laser beam position on the flow stream, where methods in these embodiments include rotating (e.g., in the X-Y plane, X-Z plane or Y-Z plane) the beam shaping component by 5 arc minute or less, such as by 4.5 arc minute or less, such as by 4 arc minute or less, such as by 3.5 arc minute or less, such as by 3 arc minute or less, such as by 2.5 arc minute or less, such as by 2 arc minute or less, such as by 1.5 arc minute or less, such as by 1 arc minute or less, such as by 0.5 arc minute or less, such as by 0.1 arc minute or less, such as by 0.05 arc minute or less, such as by 0.01 arc minute or less, such as by 0.005 arc minute or less and including by 0.001 arc minute or less.

In some embodiments, methods include assessing the generated output beams of light from beam shaping component. In some instances, assessing the generated output beams of light from beam shaping component includes assessing the beam profile along the horizontal axis, such as to determine the intensity of each output beam of light, the contained power of the 80% line width, the edge power, the normalized intensity deviation across the horizontal axis of each output beam of light, the shape of the beam profile, the spatial width of the beam profile and power distribution of each beam of light along the horizontal axis.

In some embodiments, methods include assessing irradiation of the flow stream by the generated output beams of light from beam shaping component. In some instances, assessing irradiation of the flow stream by the generated output beams of light from beam shaping component includes determining a spatial position of each laser beamspot. In other instances, assessing irradiation of the flow stream by the generated output beams of light from beam shaping component includes determining the spatial width of each laser beamspot across the flow stream (e.g., the percentage of the spatial width of the flow stream irradiated by the spatial width of each generated output beam of light).

In certain embodiments, the position of the beam shaping component is adjusted in response to the assessed irradiation of the flow stream. For example, in some instances where the position of irradiation by each generated output beam of light on the flow stream is determined to produce a light signal that is less than optimal, the beam shaping component may be displaced to the position which produces a maximal light signal amplitude. In these instances, methods may include mapping the spatially positioning of the beam shaping component (e.g., horizontal position, vertical position, angle of orientation) that produces the maximal light signal amplitude and matching the spatial position of the beam shaping component which produces the maximal light signal amplitude.

The position of the irradiation on the flow stream by the generated output beams of light from the beam shaping component may be adjusted by any convenient protocol, such as by directly moving (manually, mechanically or with a motor-driven displacement device) one or more of the laser and beam shaping component, moving support stages coupled to the laser or beam shaping component as well as changing the position, configuration or angle of orientation of one or more optical adjustment protocols (as described above). In some embodiments, the position of irradiation on the flow stream by the generated output beams of light from the beam shaping component is adjusted by manually (e.g., by hand) adjusting one or more of the spatial position of the beam shaping component and the laser. In one example, the horizontal or vertical position or the angle of orientation of the beam shaping component may be manually adjusted. In another example, the horizontal or vertical position of the laser is manually adjusted. In yet another example, the horizontal or vertical position or angle of orientation of the beam shaping component is manually adjusted and the horizontal or vertical position of the laser is manually adjusted.

Any convenient mechanical actuator can be used to mechanically adjust the spatial position of the beam shaping component or laser, such as for example a mechanical leadscrew assembly or a mechanically operated geared translation device coupled to a support stage. In one example, the horizontal or vertical position or the angle of orientation of the beam shaping component is mechanically adjusted. In another example, the horizontal or vertical position of the laser is mechanically adjusted. In yet another example, the horizontal or vertical position or angle of orientation of the beam shaping component is mechanically adjusted and the horizontal or vertical position of the laser is mechanically adjusted.

In yet other embodiments, the position of irradiation on the flow stream by the generated output beams of light from the beam shaping component is adjusted by adjusting the spatial position of one or more of the beam shaping component and the laser with a motor-driven displacement device. Any convenient motor-driven actuator can be used, such as for example a motor actuated displacement stage, motor driven leadscrew assembly, motor-operated geared actuation device employing a stepper motor, servo motor, brushless electric motor, brushed DC motor, micro-step drive motor, high resolution stepper motor, among other types of motors.

In certain embodiments, the position of irradiation on the flow stream by the generated output beams of light from the beam shaping component is adjusted by changing the position or orientation of one or more optical adjustment components. For example, the orientation of the optical adjustment protocol (e.g., one or more mirrors of the mirror component as described above) may be changed to position the beam of each laser light on a different part of the beam shaping component, such as by increasing the angle of the optical adjustment protocol by 5° or more, such as by 10° or more, such as by 15° or more, such as by 20° or more, such as by 30° or more, such as by 45° or more, such as by 60° or more and including by 75° or more.

In certain embodiments, methods include dynamically adjusting the output beams, such as by adjusting the laser, one or more optical adjustment components or the beam shaping component to have a width that is from 50% to 99.9% of the spatial width of the flow stream. In one example, the spatial width of the output beam is increased by 5% or more, such as by 10% or more, such as by 25% or more, such as by 50% or more, such as by 75% or more and including by 90% or more to achieve the desired incident width on the flow stream. In another example, the spatial width of the output beam is decreased by 5% or more, such as by 10% or more, such as by 25% or more, such as by 50% or more, such as by 75% or more and including by 90% or more to achieve the desired incident width on the flow stream. In certain embodiments, the output beams of light are adjusted to match the spatial width of the flow stream. For example, the output beams of light may be adjusted to match the spatial width of the core stream of a flow stream.

In practicing methods according to certain embodiments, a flow stream is irradiated by the generated output beams of light from the beam shaping component and light from the flow stream is collected and detected. Light from the flow stream may be forward scattered light, side scattered light, transmitted light, emitted light (e.g., fluorescence or phosphorescence) or a combination thereof. In some embodiments, methods include collecting and detecting forward scattered light from the flow stream. In other embodiments, methods include collecting and detecting side scattered light from the flow stream. In yet other embodiments, methods include collecting and detecting light transmitted through the flow stream. In still other embodiments, methods include collecting and detecting emitted light (e.g., fluorescence or phosphorescence) from the flow stream.

The flow stream may be irradiated at any suitable vertical position along the flow stream so long as light signals from the flow stream are sufficiently detected. In certain embodiments, the flow stream is a flow cytometer flow stream and is configured to irradiate the flow stream at a position immediately adjacent to the flow cell nozzle orifice. In other embodiments, the flow stream is irradiated at a position downstream from the flow cell nozzle orifice, such as at a position 0.001 mm from the flow cell nozzle orifice, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more and including 10 mm or more downstream from the flow cell nozzle orifice. The flow stream may be irradiated at one or more vertical positions, such as at 2 or more, such as at 3 or more, such as at 4 or more, such as at 5 or more and including irradiating the flow stream at 10 or more vertical positions.

Lasers of interest may include pulsed lasers or continuous wave lasers. For example, the laser may be a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include aligning a dye laser with a flow stream, such as a stilbene, coumarin or rhodamine laser. In yet other instances, methods include aligning metal-vapor laser with a flow stream, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include aligning a solid-state laser with a flow stream, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

As summarized above, methods include irradiating a flow stream with two or more lasers through a beam shaping component that generates output beams of light having a predetermined intensity profiles along a horizontal axis. In certain embodiments, methods include irradiating with 3 or more lasers, such as 4 or more lasers, such as 5 or more lasers and including 10 or more lasers. Any combination of types of lasers may be aligned with the flow stream. For example, in some embodiments, the methods include irradiating a flow stream through a beam shaping component with an array of lasers, such as an array having one or more gas lasers, one or more dye lasers and one or more solid-state lasers.

Irradiation by each of the lasers may be simultaneous or sequential, or a combination thereof. Where irradiation by each laser is sequential, each laser may be configured to independently irradiate for 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating with each laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments, the duration of irradiation by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each laser may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds.

The flow stream may be irradiated continuously or in discrete intervals. In some instances, methods include irradiating the flow stream continuously. In other instances, the flow stream is irradiated in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Light signals from the flow stream may be detected by any convenient positional sensing detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the light signals are detected with a quadrant photodiode. Where the light signals are detected with a quadrant photodiode, the active detecting surface area of each region of the quadrant photodiode may vary, such as from $0.01$ cm$^2$ to $10$ cm$^2$, such as from $0.05$ cm$^2$ to $9$ cm$^2$, such as from, such as from $0.1$ cm$^2$ to $8$ cm$^2$, such as from $0.5$ cm$^2$ to $7$ cm$^2$ and including from $1$ cm$^2$ to $5$ cm$^2$. In some instances, the photodetector is a photodiode array having more than one photodiode, such as two or more photodiodes, such as three or more, such as five or more and including 10 or more photodiodes.

In certain embodiments, the detector is positioned apart in space from the flow stream and light from the flow stream is propagated to the detector through an optical relay system, such as with fiber optics or a free space light relay system. For example, the optical relay system may be a fiber optics light relay bundle and light is conveyed through the fiber optics light relay bundle to the detector. Any fiber optics light relay system may be employed to propagate light to the detector. In certain embodiments, suitable fiber optics light relay systems for propagating light to the detector include, but are not limited to, fiber optics light relay systems such as those described in U.S. Pat. No. 6,809,804, the disclosure of which is herein incorporated by reference. In other embodiments, the optical relay system is a free-space light relay system. The phrase "free-space light relay" is used herein in its conventional sense to refer to light propagation that employs a configuration of one or more optical components to direct light to the detector through free-space. In certain embodiments, the free-space light relay system includes a housing having a proximal end and a distal end, the proximal end being coupled to the detector. The free-space relay system may include any combination of different beam shaping components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating light to the detector, but are not limited to, light relay systems such as those described in U.S. Pat. Nos. 7,643,142; 7,728,974 and 8,223,445, the disclosures of which is herein incorporated by reference.

Methods also include detecting light from the sample in the flow stream. The light detected may be side scattered light, forward scattered light, emitted light or combination thereof. Suitable light detecting protocols, include but are not limited to optical sensors or photodetectors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from the irradiated flow stream at the sample interrogation region of the particle sorting module is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, light is measured with a charge-coupled device (CCD).

Light signals from the flow stream may be measured at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from the flow stream at 400 or more different wavelengths. In some embodiments, methods include measuring light over a range of wavelengths (e.g., 200 nm-1000 nm). For example, methods may include collecting spectra of light over one or more of the wavelength ranges of 200 nm-1000 nm. In yet other embodiments, methods include measuring light from the flow stream at one or more specific wavelengths. For example, the light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of certain fluorophores.

Light from the flow stream may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the light may be taken one or more times during the subject methods, such as 2 or more times, such as 3 or more times, such as 5 or more times and including 10 or more times. In certain embodiments, the light propagation is measured 2 or more times, with the data in certain instances being averaged.

The flow rate of the flow stream according to embodiments may vary, e.g., depending on the intensity of the laser light and may be 1 nL/min or more, such as 2 nL/min or more, such as 3 nL/min or more, such as 5 nL/min or more, such as 10 nL/min or more, such as 25 nL/min or more, such as 50 nL/min or more, such as 75 nL/min or more, such as 100 nL/min or more, such as 250 nL/min or more, such as 500 nL/min or more, such as 750 nL/min or more and including 1000 nL/min or more. In certain embodiments, the flow rate of the flow stream in the subject methods ranges from 1 nL/min to 500 nL/min, such as from 1 nL/min to 250 nL/min, such as from 1 nUmin to 100 nL/min, such as from 2 nL/min to 90 nL/min, such as from 3 nL/min to 80 nL/min, such as from 4 nL/min to 70 nL/min, such as from 5 nL/min to 60 nL/min and including rom 10 nL/min to 50 nL/min. In certain embodiments, the flow rate of the flow stream is from 5 nL/min to 6 nL/min.

In embodiments, methods may include irradiating different positions along the longitudinal axis of the flow stream with one or more of the output beams of light. For example, methods may include irradiating with the output beams of light positions along the longitudinal axis of the flow stream which differ by 0.0001 mm or more, such as by 0.0005 mm or more, such as by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more, such as by 15 mm or more and including by 25 mm or more. In certain embodiments, each output beam of light may be propagated onto the flow stream at positions along the longitudinal axis that differ by 50 mm or less, such as by 25 mm or less, such as by 15 mm or less, such as by 10 mm or less, such as by 5 mm or less, such as by 4 mm or less, such as by 3 mm or less, such as by 2 mm or less, such as by 1 mm or less, such as by 0.5 mm or less, such as by 0.1 mm or less and including by 0.001 mm or less.

In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, or other biological liquid sample, e.g., tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In certain embodiments, the biological sample contains cells. Cells that may be present in the sample include eukaryotic cells (e.g., mammalian cells) and/or prokaryotic cells (e.g., bacterial cells or archaeal cells). Samples may be obtained from an in vitro source (e.g., a suspension of cells from laboratory cells grown in culture) or from an in vivo source (e.g., a mammalian subject, a human subject, etc.). In some embodiments, the cellular sample is obtained from an in vitro source. In vitro sources include, but are not limited to, prokaryotic (e.g., bacterial, archaeal) cell cultures, environmental samples that contain prokaryotic and/or eukaryotic (e.g., mammalian, protest, fungal, etc.) cells, eukaryotic cell cultures (e.g., cultures of established cell lines, cultures of known or purchased cell lines, cultures of immortalized cell lines, cultures of primary cells, cultures of laboratory yeast, etc.), tissue cultures, and the like.

Where the biological sample includes cells, methods of the present disclosure may include characterizing components of the cells, such as cell fragments, fragmented cell membranes, organelles, dead or lysed cells. In some embodiments, methods include characterizing the extracellular vesicles of the cells. Characterizing the extracellular vesicles of the cells may include identifying the type of extracellular vesicles in the cells or determining the size of the extracellular vesicles in the cells.

In some embodiments, light (e.g., forward scattered light, side scattered light, emitted light, etc.) is detected directly from the sample in the flow stream. In other embodiments, light from the sample in the flow stream is propagated to a detector with one or more beam optical adjustment components. For example, the beam path, direction, focus or collimation of the light from the sample in the flow stream may be changed with the optical adjustment component. In some instances, the dimensions of the light collected from the sample in the flow stream is adjusted, such as increasing the dimensions by 5% or more, such as by 10% or more, such as by 25% or more, such as by 50% or more and including increasing the dimensions by 75% or more or focusing the light so as to reduce the light dimensions, such as by 5% or greater, such as by 10% or greater, such as by 25% or greater, such as by 50% or greater and including reducing the dimensions by 75% or greater. In other instances, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam. In certain embodiments, the optical adjustment component is a wavelength separator. The term "wavelength separator" is used herein in its conventional sense to refer to an optical protocol for separating polychromatic light into its component wavelengths. Wavelength separation, according to certain embodiments, may include selectively passing or blocking specific wavelengths or wavelength ranges of the polychromatic light. Wavelength separation protocols of interest include, but are not limited to, colored glass, bandpass filters, interference filters, dichroic mirrors, diffraction gratings, monochromators and combinations thereof, among other wavelength separating protocols. In some embodiments, the wavelength separator is an optical filter.

For example, the optical filter may be a bandpass filter having minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm.

Methods in certain embodiments also include data acquisition, analysis and recording, such as with a computer, where multiple data channels record data from the sample as it passes through the detection region of the system. In these embodiments, analysis may include classifying and counting cells or components of cells (extracellular vesicles) such that each component is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a component of interest through the detection region. Detection of an event that exceeds the threshold for the selected parameter triggers acquisition of data for the sample component. Data is not acquired for components in the medium being assayed which cause a response below the threshold.

Computer-Controlled Systems

Aspects of the present disclosure further include computer controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating a sample in a flow stream with a first beam of light and a beam of light through an optical adjustment component that receives the first beam of light and the second beam of light at substantially the same position from different angles of incidence and is configured to generate from the first beam of light and the second beam of light an output beam of light having a predetermined intensity profile along a horizontal axis.

In some embodiments, the computer readable storage medium includes algorithm for assessing the generated output beams of light from beam shaping component. In some instances, the algorithm for assessing the generated output beams of light include algorithm for assessing the beam profile along the horizontal axis, such as to determine the intensity of each output beam of light, the contained power of the 80% line width, the edge power, the normalized intensity deviation across the horizontal axis of each output beam of light, the shape of the beam profile, the spatial width of the beam profile and power distribution of each beam of light along the horizontal axis.

In other instances, the computer readable storage medium includes algorithm for assessing irradiation of the flow stream by the generated output beams of light from beam shaping component. In some embodiments, the computer readable storage medium includes algorithm for determining a spatial position of each laser beamspot. In other embodiments, the computer readable storage medium includes algorithm for determining the spatial width of each laser beamspot across the flow stream (e.g., the percentage of the spatial width of the flow stream irradiated by the spatial width of each generated output beam of light).

In certain instances, systems include a computer having a computer readable storage medium with a computer program stored thereon, where the computer program when loaded on the computer further includes instructions having one or more of algorithm for: spatially adjusting the beam shaping component; changing the angle of orientation of the beam shaping component; spatially adjusting one or more of the lasers; changing the angle of orientation of one or more lasers; spatially adjusting one or more optical adjustment components (e.g., one or more mirrors of a mirror component, as described above); changing the angle of orientation of one or more optical adjustment components.

The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Kits

Aspects of the invention further include kits, where kits include one or more lasers, a mirror component having a first mirror and a second mirror positioned to propagate light from the first mirror to a beam combiner and a beam shaping component configured to generate from the first beam of light and the second beam of light an output beam of light having a predetermined intensity profile along a horizontal axis as described herein.

The various assay components of the kits may be present in separate containers, or some or all of them may be pre-combined. For example, in some instances, one or more components of the kit, e.g., each beam shaping component, mirror or laser is present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods, and computer systems find use in a variety of applications where it is desirable to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject systems provide fully automated protocols so that adjustments to a flow cytometer during use require little, if any human input.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A multi-laser apparatus comprising:
a plurality of lasers that produce a plurality of beams of light;
a beam shaping component that receives each of the plurality of beams of light at the same position at a surface of or within the beam shaping component from different angles of incidence and is configured to generate from the plurality of beams of light an output beam of light having a predetermined intensity profile along a horizontal axis, wherein the beam shaping component consists of a single beam shaping lens and wherein light from each laser is propagated directly to the beam shaping component; and
a flow cell configured to propagate a sample in a flow stream, wherein the beam shaping component directs the output beam to the flow cell.

2. The apparatus according to claim 1, wherein two or more lasers of the plurality of lasers are each in optical communication with a mirror component that is configured to combine the two or more beams of light produced by the two or more lasers, wherein the mirror component comprises:
a first mirror; and
a second mirror positioned to propagate light from the first mirror to the beam shaping component.

3. The apparatus according to claim 1, wherein the intensity at the center of the output beam of light is from 90% to 99.9% of the intensity at the edges of the output beam of light along the horizontal axis.

4. The apparatus according to claim 1, wherein the beam shaping component is configured to generate an output beam of light having:
a top hat intensity profile along the horizontal axis; or
a super Gaussian intensity profile along the horizontal axis.

5. The apparatus according to claim 1, wherein the output beam of light comprises a Gaussian distribution along a vertical axis of the output laser beam.

6. The apparatus according to claim 1, wherein the angle of incidence to the beam shaping component of each beam of light differs by 0.5 degrees or more.

7. The apparatus according to claim 1, wherein the output beam of light is configured to irradiate a spatial width that is from 90% to 99.9% of the flow stream along a horizontal axis.

8. The apparatus according to claim 7, wherein the beam shaping component is configured to generate a plurality of output beams of light, wherein the generated output beams of light are configured to irradiate different positions along the longitudinal axis of the flow stream.

9. The apparatus according to claim 8, wherein the output beams are separated from each other along the longitudinal axis of the flow stream by 1 mm or more.

10. The apparatus according to claim 1, wherein the single beam shaping lens is a Powell lens.

11. A method comprising irradiating a sample in a flow stream with a plurality of beams of light produced by a plurality of lasers through a beam shaping lens that receives each of the plurality of beams of light at the same position at a surface of or within the beam shaping component from different angles of incidence and is configured to generate from the plurality of beams of light an output beam of light having a predetermined intensity profile along a horizontal axis, wherein light from each laser is propagated directly to the beam shaping component.

12. The method according to claim 11, wherein two or more lasers of the plurality of lasers are each in optical communication with a mirror component that is configured to combine two or more beams of light produced by the two or more lasers.

13. The method according to claim 12, wherein the mirror component comprises:
a first mirror; and
a second mirror positioned to propagate light from the first mirror to the beam shaping lens.

14. The method according to claim 11, wherein the beam shaping lens is configured to generate an output beam of light having:
a top hat intensity profile along the horizontal axis; or
a super Gaussian intensity profile along the horizontal axis.

15. The method according to claim 11, wherein the intensity at the center of the output beam of light is from 90% to 99.9% of the intensity at the edges of the output beam of light along the vertical axis.

16. The method according to claim 11, wherein the flow stream comprises a core stream and a laminating sheath stream and
wherein an output beam of light is generated having an intensity profile that is substantially the same across from 90% to 99.9% of the core stream along a horizontal axis.

17. The method according to claim 16, wherein the method comprises:
generating a first output laser beam having a top hat intensity profile along a horizontal axis; and
generating a second output laser beam having a super Gaussian intensity profile along the horizontal axis.

18. The method according to claim 11, wherein the beam shaping lens is a Powell lens.

19. The method according to claim 11, wherein the method further comprises focusing the output beam of light onto the sample with a focusing lens that receives the output beam of light from the beam shaping lens and directs the output beam to the sample.

20. The method according to claim 19, wherein the focusing lens receives the output beam of light directly from the beam shaping lens and directs the output beam directly to the sample.

21. The apparatus according to claim 1, wherein the system further comprises a focusing lens that receives the output beam of light from the beam shaping component and directs the output beam to the flow cell.

22. The apparatus according to claim 21, wherein the focusing lens receives the output beam of light directly from the beam shaping component and directs the output beam directly to the flow cell.

* * * * *